(12) United States Patent
Chiu et al.

(10) Patent No.: US 11,842,131 B2
(45) Date of Patent: Dec. 12, 2023

(54) METHOD AND SYSTEM FOR GENERATING LAYOUT DIAGRAM FOR SEMICONDUCTOR DEVICE HAVING ENGINEERING CHANGE ORDER (ECO) CELLS

(71) Applicant: TAIWAN SEMICONDUCTOR MANUFACTURING COMPANY, LTD., Hsinchu (TW)

(72) Inventors: Mao-Wei Chiu, Hsinchu (TW); Ting-Wei Chiang, Hsinchu (TW); Hui-Zhong Zhuang, Hsinchu (TW); Li-Chun Tien, Hsinchu (TW); Chi-Yu Lu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 27 days.

(21) Appl. No.: 17/222,057

(22) Filed: Apr. 5, 2021

(65) Prior Publication Data
US 2021/0224444 A1  Jul. 22, 2021

Related U.S. Application Data

(60) Continuation of application No. 16/895,803, filed on Jun. 8, 2020, now Pat. No. 10,970,440, which is a
(Continued)

(51) Int. Cl.
*G06F 30/30* (2020.01)
*G06F 30/39* (2020.01)
(Continued)

(52) U.S. Cl.
CPC .............. *G06F 30/30* (2020.01); *G06F 30/39* (2020.01); *G06F 30/392* (2020.01);
(Continued)

(58) Field of Classification Search
CPC ........ G06F 30/30; G06F 30/39; G06F 30/392; G06F 30/394; G06F 30/398;
(Continued)

(56) References Cited

U.S. PATENT DOCUMENTS

| 4,928,160 A | 5/1990 | Crafts |
| 5,214,299 A | 5/1993 | Gal et al. |

(Continued)

FOREIGN PATENT DOCUMENTS

| JP | 2002016141 | 1/2002 |
| JP | WO2010073610 | 7/2010 |

(Continued)

OTHER PUBLICATIONS

Office Action dated Aug. 9, 2018 from corresponding application No. KR 10-2017-0120309.
(Continued)

*Primary Examiner* — Stacy Whitmore
(74) *Attorney, Agent, or Firm* — Hauptman Ham, LLP

(57) ABSTRACT

A method for manufacturing a semiconductor device to which corresponds a layout diagram stored on a non-transitory computer-readable medium. The method includes generating the layout diagram using an electronic design system (EDS), the EDS including at least one processor and at least one memory including computer program code for one or more programs are configured to cause the EDS to execute the generating. Testing the semiconductor device. Revising, the layout diagram, based on testing results indicative of selected standard functional cells in the layout diagram which merit modification or replacement. Programming one or more of the ECO cells which correspond to the one or more selected standard functional cells resulting in one or more programmed ECO cells. Routing the one or more programmed ECO cells correspondingly to at least one
(Continued)

of the selected standard functional cells or to one or more other ones of the standard functional cells.

20 Claims, 22 Drawing Sheets

Related U.S. Application Data continuation of application No. 16/186,788, filed on Nov. 12, 2018, now Pat. No. 10,678,977, which is a division of application No. 15/370,418, filed on Dec. 6, 2016, now Pat. No. 10,127,340.

(60) Provisional application No. 62/402,953, filed on Sep. 30, 2016.

(51) Int. Cl.
*G06F 30/392* (2020.01)
*G06F 30/394* (2020.01)
*G06F 30/398* (2020.01)
*G06F 115/08* (2020.01)
*H01L 23/528* (2006.01)
*H01L 27/02* (2006.01)

(52) U.S. Cl.
CPC .......... *G06F 30/394* (2020.01); *G06F 30/398* (2020.01); *G06F 2115/08* (2020.01); *H01L 23/528* (2013.01); *H01L 27/0207* (2013.01)

(58) Field of Classification Search
CPC ............... G06F 2115/08; H01L 23/528; H01L 27/0207; H01L 27/0611
See application file for complete search history.

(56) References Cited

U.S. PATENT DOCUMENTS

| | | | |
|---|---|---|---|
| 5,623,420 A | 4/1997 | Yee et al. | |
| 5,666,288 A | 9/1997 | Jones et al. | |
| 6,446,248 B1 | 9/2002 | Solomon et al. | |
| 7,137,094 B2 | 11/2006 | Tien | |
| 7,240,318 B2 | 7/2007 | Ito et al. | |
| 7,458,051 B2 | 11/2008 | Hou et al. | |
| 8,174,868 B2 | 5/2012 | Liaw | |
| 8,230,380 B2 | 7/2012 | Penzes | |
| 8,276,109 B2 | 9/2012 | Penzes et al. | |
| 8,410,526 B2 | 4/2013 | Shimizu | |
| 8,411,492 B2 | 4/2013 | Nardone et al. | |
| 8,421,205 B2 | 4/2013 | Yang | |
| 8,423,946 B1 | 4/2013 | Jin et al. | |
| 8,446,176 B1 | 5/2013 | Yang et al. | |
| 8,584,052 B2 | 11/2013 | Chen et al. | |
| 8,661,389 B2 | 2/2014 | Chern et al. | |
| 8,698,205 B2 | 4/2014 | Tzeng et al. | |
| 8,728,892 B2 | 5/2014 | Ou et al. | |
| 8,775,999 B2 | 7/2014 | Chueh et al. | |
| 8,826,212 B2 | 9/2014 | Yeh et al. | |
| 8,836,141 B2 | 9/2014 | Chi et al. | |
| 8,875,076 B2 | 10/2014 | Lin et al. | |
| 8,943,455 B2 | 1/2015 | Chen et al. | |
| 9,105,467 B2 | 8/2015 | Lee et al. | |
| 9,147,029 B2 | 9/2015 | Ke et al. | |
| 9,236,343 B2 | 1/2016 | Cicalo | |
| 9,292,649 B2 | 3/2016 | Lee et al. | |
| 9,443,053 B2 | 9/2016 | Jayakumar et al. | |
| 9,529,954 B1 | 12/2016 | Haigh | |
| 9,678,421 B2 | 6/2017 | Levinski et al. | |
| 9,761,575 B1 | 9/2017 | Lam et al. | |
| 9,786,648 B1 | 10/2017 | Lam et al. | |
| 9,852,251 B2 | 12/2017 | Lu et al. | |
| 10,146,900 B2* | 12/2018 | Sahu ................. H01L 27/0207 | |
| 2002/0002699 A1 | 1/2002 | Nakajima | |
| 2004/0148582 A1 | 7/2004 | Ito et al. | |
| 2004/0218831 A1 | 11/2004 | Liu | |
| 2005/0132317 A1 | 6/2005 | Kolk et al. | |
| 2005/0198604 A1 | 9/2005 | Yoshia et al. | |
| 2005/0235240 A1 | 10/2005 | Tien | |
| 2006/0181307 A1 | 8/2006 | Shibayashi et al. | |
| 2007/0157151 A1* | 7/2007 | Kim ................. G06F 30/394 | |
| | | | 716/120 |
| 2007/0252217 A1 | 11/2007 | Oki | |
| 2007/0290270 A1 | 12/2007 | Ko et al. | |
| 2008/0077903 A1 | 3/2008 | Dinter et al. | |
| 2009/0249273 A1 | 10/2009 | Tsai et al. | |
| 2010/0031215 A1 | 2/2010 | Ramsour et al. | |
| 2010/0125823 A1 | 5/2010 | Renwick et al. | |
| 2010/0162184 A1 | 6/2010 | Penzes | |
| 2010/0162187 A1 | 6/2010 | Penzes et al. | |
| 2010/0164547 A1 | 7/2010 | Ciccarelli et al. | |
| 2010/0201400 A1 | 8/2010 | Nardone et al. | |
| 2010/0229141 A1 | 9/2010 | Dinter et al. | |
| 2010/0231256 A1 | 9/2010 | Jain et al. | |
| 2010/0248481 A1 | 9/2010 | Shultz | |
| 2011/0024869 A1 | 2/2011 | Nakajima et al. | |
| 2012/0001655 A1* | 1/2012 | Ciccarelli ............... G06F 30/39 | |
| | | | 326/103 |
| 2012/0211840 A1 | 8/2012 | Shimizu | |
| 2012/0223368 A1 | 9/2012 | Sherlekar et al. | |
| 2012/0286331 A1 | 11/2012 | Aton et al. | |
| 2013/0093027 A1 | 4/2013 | Kato et al. | |
| 2014/0091478 A1 | 4/2014 | Furuta et al. | |
| 2014/0130003 A1 | 5/2014 | Cheuh et al. | |
| 2014/0134543 A1 | 5/2014 | Tung | |
| 2014/0167815 A1 | 6/2014 | Penzes | |
| 2014/0181774 A1 | 6/2014 | Hatamian et al. | |
| 2014/0229908 A1 | 8/2014 | Sherlekar et al. | |
| 2014/0264924 A1 | 9/2014 | Yu et al. | |
| 2014/0282289 A1 | 9/2014 | Hsu et al. | |
| 2014/0282323 A1 | 9/2014 | Jain et al. | |
| 2014/0327050 A1 | 11/2014 | Hsieh et al. | |
| 2014/0332979 A1 | 11/2014 | Cicalo | |
| 2015/0143309 A1 | 5/2015 | de Dood et al. | |
| 2015/0279453 A1 | 10/2015 | Fujiwara et al. | |
| 2015/0318241 A1 | 11/2015 | Chang et al. | |
| 2015/0333008 A1 | 11/2015 | Gupta et al. | |
| 2015/0347659 A1 | 12/2015 | Chiang et al. | |
| 2015/0357279 A1 | 12/2015 | Fujiwara et al. | |
| 2016/0012169 A1 | 1/2016 | Chiang et al. | |
| 2016/0020199 A1 | 1/2016 | Fu | |
| 2016/0055283 A1 | 2/2016 | Oh et al. | |
| 2016/0063166 A1 | 3/2016 | Hsieh et al. | |
| 2016/0085898 A1 | 3/2016 | Manohar et al. | |
| 2016/0181235 A1 | 6/2016 | Pincu et al. | |
| 2017/0083653 A1* | 3/2017 | Sahu ................. G06F 30/39 | |
| 2017/0116366 A1* | 4/2017 | Seo ................. G06F 30/23 | |
| 2017/0170162 A1 | 6/2017 | Pincu et al. | |
| 2017/0256446 A1 | 9/2017 | Cha et al. | |
| 2017/0262566 A1 | 9/2017 | Chiang et al. | |
| 2017/0294448 A1 | 10/2017 | Debacker et al. | |
| 2018/0090513 A1 | 3/2018 | Datta | |
| 2018/0150586 A1 | 5/2018 | Tien et al. | |
| 2018/0225402 A9 | 8/2018 | de Dood et al. | |
| 2019/0026417 A1 | 1/2019 | de Dood et al. | |
| 2019/0172841 A1 | 6/2019 | Kishishita | |
| 2022/0374001 A1* | 11/2022 | Jain ................. G05B 23/0205 | |
| 2022/0375051 A1* | 11/2022 | Brauer ................. G06T 7/001 | |

FOREIGN PATENT DOCUMENTS

| | | |
|---|---|---|
| JP | 2013239646 | 11/2013 |
| TW | 200416998 | 9/2004 |
| TW | 200705637 | 2/2007 |
| TW | 200802099 | 1/2008 |
| TW | 201435629 | 9/2014 |

OTHER PUBLICATIONS

Notice of Allowance dated Feb. 9, 2018 from corresponding application No. TW 106114882.

(56) References Cited

OTHER PUBLICATIONS

Notice of Allowance dated Dec. 17, 2019 from corresponding application No. TW 107108254.

* cited by examiner

METHOD AND SYSTEM FOR GENERATING LAYOUT DIAGRAM FOR SEMICONDUCTOR DEVICE HAVING ENGINEERING CHANGE ORDER (ECO) CELLS

PRIORITY CLAIM

The present application is a continuation of U.S. application Ser. No. 16/895,803, filed on Jun. 8, 2020, now U.S. Pat. No. 10,970,440, issued on Apr. 6, 2021, which is a continuation of U.S. application Ser. No. 16/186,788, filed Nov. 12, 2018, now U.S. Pat. No. 10,678,97, issued Jun. 9, 2020, which is a divisional of U.S. application Ser. No. 15/370,418, filed Dec. 6, 2016, now U.S. Pat. No. 10,127,340, issued Nov. 13, 2018, which claims the priority of U.S. Provisional Application No. 62/402,953, filed Sep. 30, 2016, which are incorporated herein by reference in their entireties.

BACKGROUND

An integrated circuit (IC) includes a number of electronic devices. One way in which to represent the IC is as a layout diagram (hereinafter, layout). A layout is hierarchical and is decomposed into modules which carry out higher-level functions as required by the IC's design specifications. In some circumstances, a semi-custom design (SCD) project decomposes the modules into macro cells, standard cells and custom cells.

For a given SCD project, a custom cell is designed with an arrangement that is specific to the given SCD project in order to provide (in operation) a higher-level logic function that is specific to the SCD project. By contrast, a library of standard cells is designed with no particular project in mind and includes standard cells which provide (in operation) common, lower-level logic functions. In terms of a footprint within a layout, custom cells are larger (typically much larger) than standard cells. Moreover, for a given library, all of the standard cells have at least one dimension which is the same size (typically, the size being a multiple of a library-specific fixed dimension) in order to facilitate placement of the standard cells into a layout. As such, standard cells are described as being predefined with respect to a given SCD project. Custom cells may or may not have at least one dimension that is the same size as the corresponding dimension of the standard cells.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
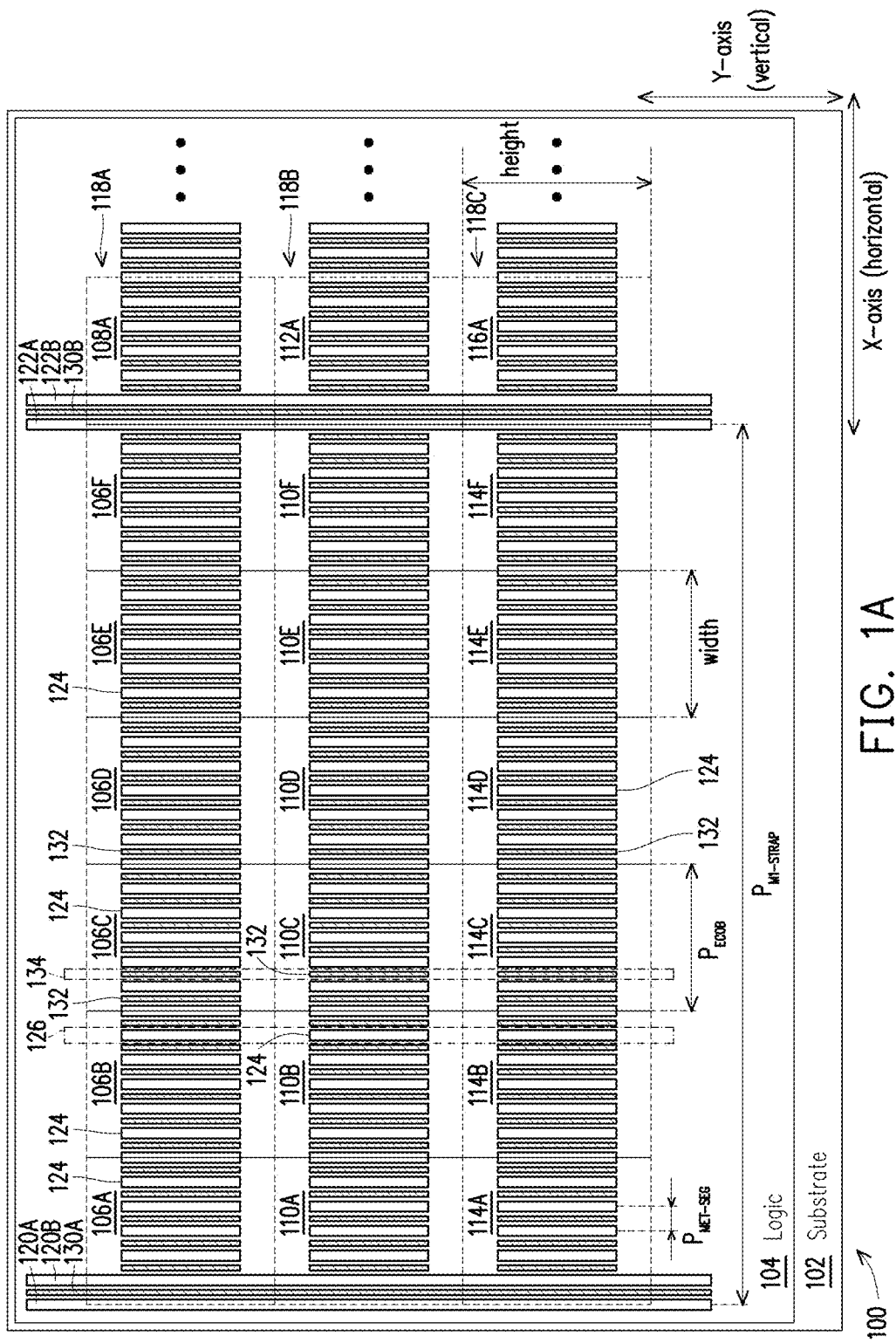
FIG. 1A is a layout, for a semiconductor device, of engineering change order (ECO) base cells relative to line segments, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

When placing Engineering Change Order (ECO) base cells into a row of a layout, minimizing gaps between adjacent ECO base cells reduces wasted space and increases density (in terms of the number of devices per cell). Also, placement of ECO base cells into a row of a layout is simplified if the ECO base cells are fixed not merely in height but also in width. In some embodiments, gaps are reduced and placement of ECO base cells into a row is simplified by using a pitch of the ECO base cells, $P_{ECOB}$ (or $P_{SPARE}$), which is evenly divisible into a pitch of the M1 straps, $P_{M1\text{-}STRAP}$. In some embodiments, a strap is one or more segments in a metallization layer which carry an operational voltage, e.g., VDD, VSS or the like. The first metallization layer is referred to as M1. Hence, a strap in the M1 layer is an M1 strap. In some embodiments, to eliminate gaps (achieve abutment) between adjacent ECO base cells when placing ECO base cells into a row, pitch $P_{ECOB}$ of the ECO base cells is chosen to be consistent with the even/odd status of the number of masking patterns/colors CLR.

In the context of a semi-custom design (SCD) project, in addition to standard cells and custom cells, macro cells may also be included. Similar to custom cells, macro cells provide a higher-level function than standard cells. However, similar to standard cells, macro cells are designed with no particular project in mind. As such, macro cells are designed with an arrangement which provides a higher-level logic function that is common, e.g., RAM, ROM, serial interface, timer, arithmetic logic unit (ALU) processor core, or the like. Macro cells having a higher-level function consume a larger footprint. As such, macro cells have a much larger footprint than standard cells. Some macro cells are arrangements of standard cells.

Also similar to custom cells, macro cells do not have at least one dimension that is the same size as the corresponding dimension of the standard cells. For this reason, macro cells and custom cells will be referred to as non-standard cells.

There are two types of standard cells, standard functional cells and standard spare cells, the latter being referred to as engineering change order (ECO) cells. Standard functional cells are defined with specific internal arrangements of components to provide (in operation) corresponding common, lower-level functions, e.g., logic functions including an inverter, NAND, NOR, XOR, D-latch, decoupling capacitor (DeCap), and-or-invert (AOI), or-and-invert (OAI), multiplexer, flip-flop, or the like.

ECO cells include ECO base cells and ECO programmed cells. An ECO programmed cell refers to an ECO base cell which has been programmed. Similar to a functional cell, an ECO base cell is defined with a specific internal arrangement of components. Unlike a functional cell, an ECO base cell is not arranged to provide a specific function. In contrast to standard cells which operate (are operational), an ECO base cell (which has not yet been programmed) does not operate (is not operational).

Recalling that ECO base cells are spare cells, the arrangement of an ECO base cell is sufficient that, if needed, the ECO base cell is able to be 'programmed' (transformed) to operate and provide one of the same, common, low-level functions provided by a corresponding standard functional cell. In some embodiments, the arrangement of each ECO base cell is sufficient so that a given ECO base cell is able to be 'programmed' (transformed) to operate and provide one of the logic functions including an inverter, NAND, NOR, XOR, D-latch, decoupling capacitor (DeCap), and-or-invert (AOI), or-and-invert (OAI), multiplexer, flip-flop, or the like. In some embodiments, an ECO base cell is programmed (transformed) into an ECO programmed cell by altering one or more connections within at least one ECO base cell (intra-ECO-base-cell connections) such as metal to silicon contacts and metal to polysilicon contacts, or making other metal layer changes with corresponding vias or contacts.

During an SCD project, electronic design automation (EDA) tools are used to select standard functional cells from standard cell libraries and place the standard functional cells into an initial layout along with non-standard cells (if any). EDA tools are also used to perform routing by which the standard functional cells and the non-standard cells are connected using one or more metal layers and corresponding vias and contacts. EDA tools are further used to test the routing. Depending upon the test results, the selection, placement and routing of the standard and non-standard cells is revised. In at least some embodiments, the overall selection, placement, routing and testing (SPRT) process is iterative. Eventually, the SPRT process iterations converge to a finalized layout.

For a variety of reasons (e.g., a design change, an unacceptable timing issue, an unacceptable electromigration issue, or the like), it is common for a nearly finalized layout (or a layout that otherwise would have been regarded as a final layout) to be required to undergo revision. In anticipation of circumstances in which the revision would be relatively minor in scope, and as a safeguard (or hedge) against having to restart (begin anew) the iterative SPRT process, EDA tools are also used to place one or more ECO base cells into the initial layout.

Because the ECO base cells do not operate, the ECO base cells are not connected to functional cells. When the nearly finalized layout is to be revised, one or more ECO base cells are 'programed,' which converts the one or more ECO base cells into one or more ECO 'programmed' cells. Then, the ECO programmed cell is routed to be operatively connected to one or more standard functional cells. In some embodiments, ECO base cells correspond to ECO base cells disclosed in U.S. Pat. No. 7,137,094, granted Nov. 14, 2006, the entirety of which is hereby incorporated by reference. In some embodiments, ECO base cells correspond to ECO base cells disclosed in U.S. Pat. No. 7,458,051, granted Nov. 25, 2008, the entirety of which is hereby incorporated by reference.

FIG. 1A is a layout 100A, for a semiconductor device, of ECO base cells relative to line segments in an $i^{th}$ metallization layer, M(i), in accordance with some embodiments.

Figure 1B:
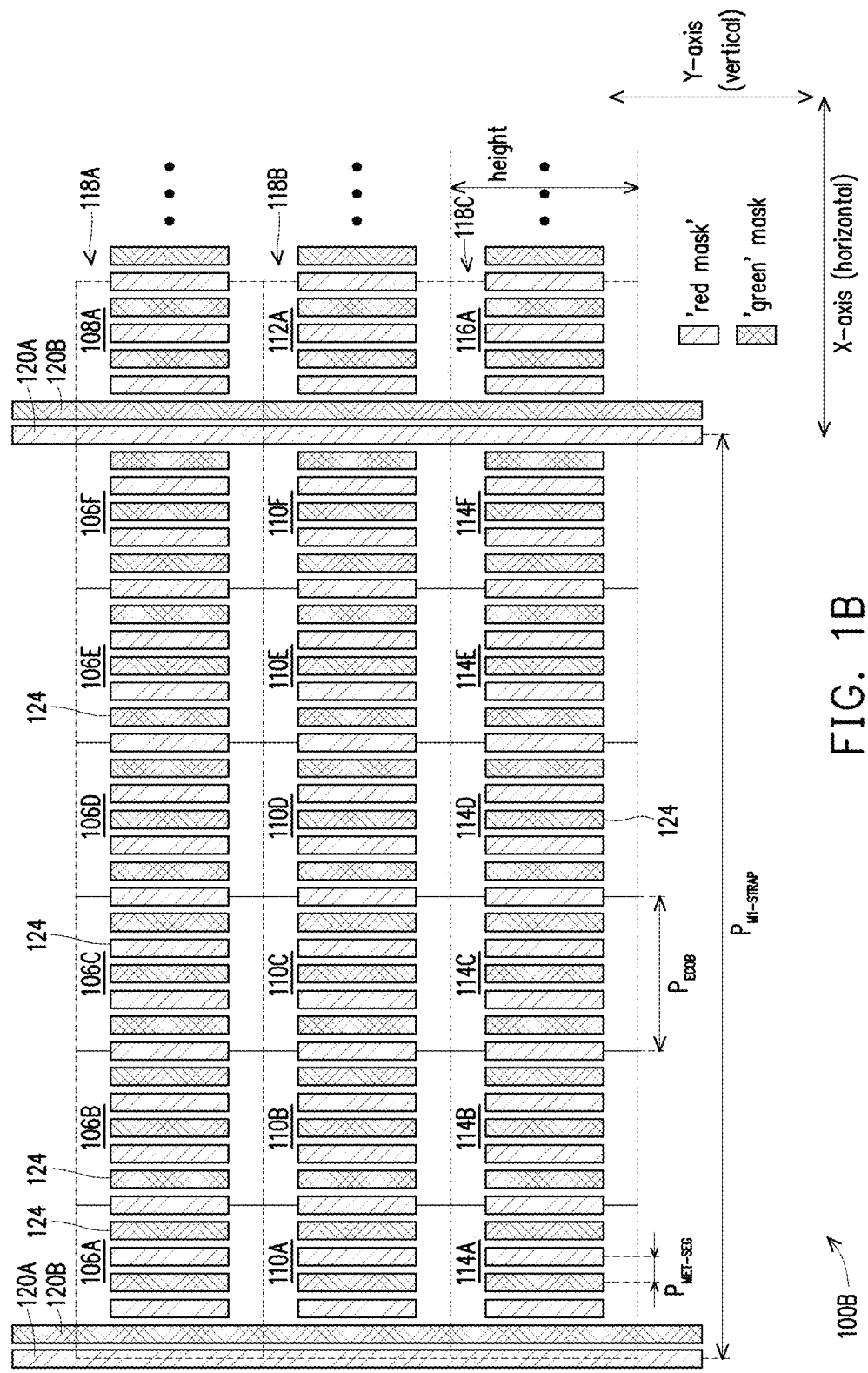
FIG. 1B is a layout, corresponding to the layout of FIG. 1A, of allotment of metallization segments to corresponding masking patterns/colors, in accordance with some embodiments.
Figure 1C:
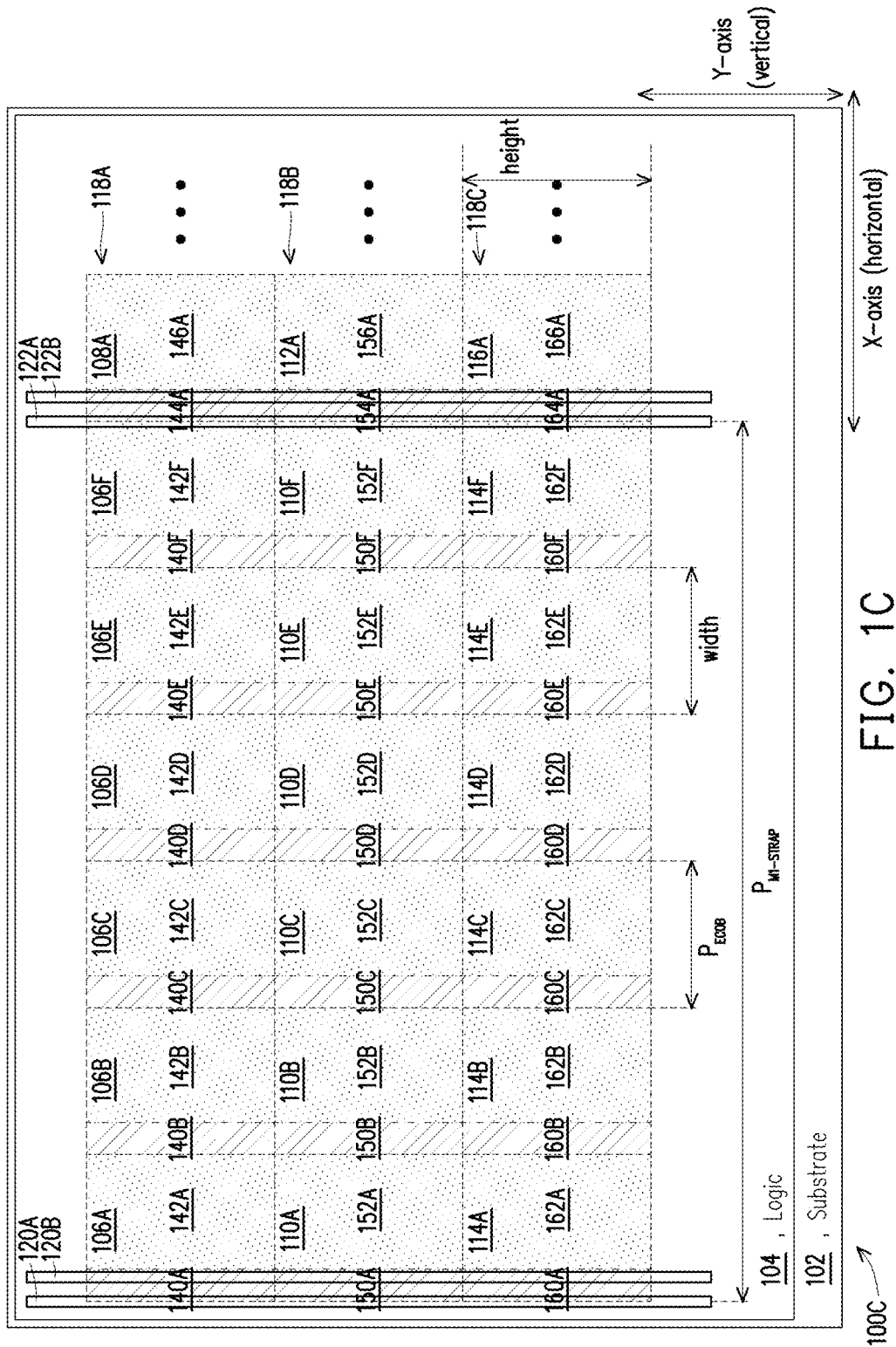
FIG. 1C is a layout, corresponding to the layout of FIG. 1A, of reserved regions in the ECO base cells, in accordance with some embodiments.

In some embodiments, the M(i) layer is M1. In FIGS. 1A-1C, M(i) is M1.

In FIG. 1A, layout 100A is of a semiconductor device which includes an IC formed on a substrate 102. Substrate 102 includes a logic area 104 in which standard functional cells (not illustrated) and standard ECO base cells are formed. Logic area 104 is shown as including ECO base cells 106A-106F, 108A, 110A-110F, 112A, 114A-114F and 116A. Other quantities of ECO base cells are contemplated. For simplicity of illustration, an ECO base cell is represented in FIG. 1A by its boundary. For simplicity of illustration, components and intra-ECO-base-cell connections of each ECO base cell are not shown.

As noted, for a given library, all of the standard cells have at least one dimension which is fixed at the same size in order to facilitate placement of the standard cells into a layout. In some embodiments, the fixed size is a multiple of a library-specific fixed dimension. In some embodiments, the fixed size is a multiple of the minimum pitch between polysilicon features, $P_{POLY}$.

In some embodiments, the standard cells (including standard functional cells and standard ECO base cells) are polygons. In some embodiments, the standard cells are rectangular polygons. In some embodiments, from the perspective of a plan view, the X-axis is horizontal and the Y-axis is vertical such that the horizontal and vertical dimensions of a rectangular standard cell are described as the corresponding width and height of the cell. In some embodiments, the layout is arranged in rows, and the height of all the standard cells is the same to facilitate placing the standard cells into the rows of the layout.

Returning to FIG. 1A, ECO base cells 106A-106F and 108A are arranged in the horizontal direction and located in a first row 118A. ECO base cells 110A-110E and 112A are arranged in the horizontal direction and located in a second row 118B. ECO base cells 114A-114F and 116A are arranged in the horizontal direction and located in a third row 118C. All of ECO base cells 106A-106F, 108A, 110A-110F, 112A, 114A-114F and 116A have the same size in the vertical direction (same height). However, other configurations are within the scope of the present disclosure. In the first row, adjacent ones of ECO base cells 106A-106F and 108A abut horizontally. In particular, in first row 118A, ECO base cell 106A abuts ECO base cell 106B, ECO base cell 106B abuts ECO base cell 106C, and so on. In second row 118B, adjacent ones of ECO base cells 110A-110F and 112A abut horizontally. In particular, ECO base cell 110A abuts ECO base cell 110B, ECO base cell 110B abuts ECO base cell 110C, and so on. In third row 118C, adjacent ones of ECO base cells 114A-114F and 116A abut horizontally. In particular, ECO base cell 114A abuts ECO base cell 114B, ECO base cell 114B abuts ECO base cell 114C, and so on.

To facilitate inter-cell connections, a layout comprises a stack of planar 'metallization' layers interspersed with planar inter-layer dielectric (ILD) structures. A given 'metallization' layer includes parallel conductive line segments. In some embodiments, the conductive line segments are metal. In some embodiments, the parallel line segments in successive metallization layers are orthogonal to each other. In some embodiments, the parallel line segments in an $i^{th}$ metallization layer (M(i)) extend in a first direction, the parallel line segments in an $(i+1)^{th}$ metallization layer (M(i+1)) extend in a second direction which is orthogonal to the first direction, the parallel line segments in an $(i+2)^{th}$ metallization layer (M(i+2)) extend in the first direction, the parallel line segments in an $(i+3)^{th}$ metallization layer (M(i+3)) extend in the second direction, and so on. In some embodiments, the first direction is parallel to the X-axis, and the second direction is parallel to the Y-axis.

In some embodiments, the segments of the $i^{th}$ metallization layer M(i) are regularly spaced apart, which is described as the pitch of the metallization segments, $P_{MET-SEG}(i)$. In some embodiments, the pitch $P_{MET-SEG}(i)$ is a multiple of the minimum pitch between polysilicon features, $P_{POLY}$.

An ILD structure provides insulation between a metallization layer which is formed on the ILD structure and another structure on which the ILD structure is formed. In some embodiments, the other structure is another metallization layer. In some embodiments, the other structure is a silicon substrate which includes, e.g., transistor components, or the like. As such, much of an ILD structure is a dielectric material. When formed underneath an M(i+1) layer, an ILD structure is referred to as an $i^{th}$ ILD structure (ILD(i)).

Where the ILD(i) is interposed between M(i+1) and M(i) layers, in order to establish a connection between an M(i+1) segment (which extends in the first direction) in the M(i+1) layer and an M(i) segment (which extends in the second direction) in the M(i) layer, ILD(i) also includes contact/vias structures which extend in a third direction which is orthogonal to the first and second directions. Similarly, where i=1, ILD0 is interposed between the M1 layer and the substrate. To establish a connection between an M1 segment and a component in the substrate, e.g., a transistor component, or the like, ILD0 also includes contact structures which extend in the third direction. In some embodiments, the third direction is parallel to the Z-axis. In some embodiments, the M(i) layer is M1. In FIG. 1A, M(i) is M1.

As noted, the ECO base cells in layout 100A of FIG. 1A are laid out (or arranged) relative to line segments in the M1 layer. Accordingly, FIG. 1A shows M1 line segments (M1 segments) as parallel rectangles 120A, 120B, 122A, 122B and 124. For context, gate structures are shown in layout 100A of FIG. 1A as parallel rectangles 130A, 130B and 132 interspersed with corresponding M1 segments 120A, 120B, 122A, 122B and 124.

It is noted that not all of M1 segments 120A, 120B, 122A and 122B, the multiple instances of M1 segment 124, gate structures 130A and 130B and the multiple instances of gate structure 132 will necessarily remain after the ECO base cells are initially formed and/or after one or more of the ECO base cells are programmed. For example, each of M1 segments 120A, 120B, 122A and 122B and gate structures 130A and 130B, each of the multiple instances of M1 segment 124, and each of the multiple instances of gate structure 132 has the potential to remain after the ECO base cells are initially formed. Accordingly, it is contemplated that any given ECO base cell could have a different quantity of M1 segments and/or a different quantity of gate structures.

In some embodiments, the ECO base cells are initially formed using a cut-last technique which includes forming all possible gate structures, removing (cutting) selected gate structures in whole or in part, forming all possible M1 segments, and removing (cutting) selected M1 segments in whole or in part such that fewer than all of the multiple instances of M1 segment 124 and less than all of the multiple instances of gate structure 132 remain. In some embodiments, the ECO base cells are initially formed using a cut-last technique which includes forming all possible M1 segments, and removing (cutting) selected M1 segments in whole or in part, forming all possible gate structures, removing (cutting) selected gate structures in whole or in part, such that fewer than all of the multiple instances of M1 segment 124 and less than all of the multiple instances of gate structure 132 remain. In some embodiments, when an ECO base cell is programmed, one or more of the remaining multiple instances of M1 segment 124 are cut, thereby leaving yet fewer instances of M1 segment 124 remaining.

Each of M1 segments 120A, 120B, 122A, 122B and 124 has a shorter dimension parallel to the X-axis and a longer dimension parallel to the Y-axis. As such, the long axis of each of M1 segments 120A, 120B, 122A, 122B and 124 is regarded as orthogonally intersecting a corresponding one or more of rows 118A-118C. Each of M1 segments 120A, 120B, 122A and 122B is sufficiently long to span (orthogonally) rows 118A-118C. By contrast, each M1 segment 124 is shorter in length as compared to M1 segments 120A, 120B, 122A and 122B. Corresponding M1 segments in first row 118A, second row 118B and third row 118C align in the vertical direction, as called out by phantom rectangle 126. Other horizontal dimensions and/or or vertical dimensions for M1 segments 120A, 120B, 122A and 122B are contemplated.

In some embodiments, each M1 segment 124 is sufficiently short in length to not extend outside a corresponding top and/or bottom edge of one or more of ECO base cells 106A-106F, 108A, 110A-110F, 112A, 114A-114F and 116A in the vertical direction. In some embodiments, all M1 segments 124 are placed so that an imaginary horizontal reference line bisecting each M1 segment 124 is collinear with an imaginary horizontal reference line bisecting a corresponding one or more of ECO base cells 106A-106F, 108A, 110A-110F, 112A, 114A-114F and 116A. Other vertical locations for M1 segments 124 with respect to one or more corresponding ECO base cells 106A-106F, 108A, 110A-110F, 112A, 114A-114F and 116A are contemplated. Other horizontal dimensions and/or or vertical dimensions for M1 segments 124 are contemplated.

For context, gate structures 130A, 130B and 132 are shown in layout 100A of FIG. 1A as parallel rectangles 130A, 130B and 132. Each of gate structures 130A, 130B and 132 has a shorter dimension parallel to the X-axis and a longer dimension parallel to the Y-axis. As such, the long axis of each of gate structures 130A, 130B and 132 is regarded as orthogonally intersecting a corresponding one or more of rows 118A-118C. Each of gate structures 130A and 130B is sufficiently long to span (orthogonally) rows 118A-118C. By contrast, each gate structure 132 is shorter in length as compared to gate structures 130A and 130B. Other vertical locations for gate structures 132 with respect to one or more corresponding ECO base cells 106A-106F, 108A, 110A-110F, 112A, 114A-114F and 116A are contemplated. Corresponding gate structures 132 in first row 118A, second row 118B and third row 118C align in the vertical direction, as called out by phantom rectangle 134.

In some embodiments, each M1 segment 124 is sufficiently short in length to not extend across a corresponding one or more of ECO base cells 106A-106F, 108A, 110A-110F, 112A, 114A-114F and 116A in the vertical direction. In some embodiments, all M1 segments 124 are placed so that an imaginary horizontal reference line bisecting each M1 segment 124 is collinear with an imaginary horizontal reference line bisecting a corresponding one or more of ECO base cells 106A-106F, 108A, 110A-110F, 112A, 114A-114F and 116A. Other horizontal dimensions and/or or vertical dimensions for gate structures 130A, 130B and 132 are contemplated.

In some embodiments, when one or more ECO base cells are programmed (transformed), a result is one or more corresponding ECO programmed cells. Also as a result, the one or more intra-ECO-base-cell connections which are altered consequently include at least one connection to a corresponding metallization segment in the M1 layer. In some embodiments, when routing an ECO programmed cell, one or more inter-cell connections between the ECO programmed cell and one or more standard functional cells are established. At least one of the inter-cell connections is a connection to an M1 segment.

During global routing, some of the line segments in the M1 layer are intended for use as straps (M1 straps). In some embodiments, some of the M1 straps are connected to the system voltage, VDD. In some embodiments, some of the M1 straps are connected to the system ground, VSS. In some embodiments, the strap segments span multiple rows in the layout.

In some embodiments, within a logic area of the layout, the M1 straps are regularly spaced apart, which is described as the pitch of the M1 straps, $P_{M1\text{-}STRAP}$. In some embodiments, the pitch of the M1 straps, $P_{M1\text{-}STRAP}$ is a multiple of the pitch of the metallization segments, $P_{MET\text{-}SEG}$. Returning to FIG. 1A, within logic area 104, M1 segments 120A, 120B, 122A and 122B are intended for use as strap segments. As such, M1 segments 120A and 120B represent a first strap in the M1 layer, and M1 segments 122A and 122B represent a second strap in the M1 layer. In FIGS. 1A-1C, each strap includes two M1 segments, e.g., the first strap includes M1 segments 120A and 120B, the second strap segment includes M1 segments 122A and 122B, and the like. In some embodiments, other quantities of M1 segments are intended for use as strap segments. In some embodiments, the first M1 strap is connected to the system voltage, VDD, and the second M1 strap is connected to the system ground, VSS.

By contrast, the multiple instances of M1 segment 124 are intended for use as non-strap segments. It is to be recalled that a strap is one or more segments in a metallization layer which carry an operational voltage, e.g., VDD, VSS, or the like. Accordingly, in some embodiments, a non-strap segment in a metallization layer is a segment that is not directly connected to a strap segment. Hence, a non-strap segment does not carry an operational voltage, e.g., VDD, VSS, or the like. In some embodiments, M1 non-strap segments are used for connecting components within a given ECO base cell or making connections between the given ECO base cell and one or more other standard cells. The one or more intra-ECO-base-cell connections which are altered during programming include at least one connection to a corresponding one or more instances of M1 non-strap segment 124. In some embodiments, when routing an ECO programmed cell to establish one or more inter-cell connections between the ECO programmed cell and one or more standard functional cells, at least one of the inter-cell connections is a connection to an instance of M1 non-strap segment 124.

To produce semiconductor device feature sizes smaller than can be achieved using a single optical lithographic exposure, a multiple optical lithographic exposure (OLE) technique is used. In general, a dual OLE technique will produce feature sizes smaller than a single OLE technique, a triple OLE technique will produce feature sizes smaller than a dual OLE technique, and so on. The number of OLEs is generally referred to as the number of masking (or mask)

patterns (or mask colors). Herein, the number of masking patterns/colors is referred to as CLR, where CLR is a positive integer.

In some embodiments, layout 100A is formed using a multiple OLE technique. In some embodiments, layout 100A is formed using a multiple OLE technique in which CLR is an odd number. In some embodiments, layout 100A is formed using a triple OLE technique, where CLR=3. In some embodiments, layout 100A is formed using a multiple OLE technique in which CLR is an even number. In some embodiments, layout 100A is formed using a dual OLE technique, where CLR=2. It is noted that FIG. 1A assumes a circumstance in which a dual OLE technique is used, i.e., CLR=2.

FIG. 1B is a layout 100A, corresponding to layout 100A, showing allotment of each metallization segment to one of a corresponding one or more masking patterns/colors, in accordance with some embodiments.

Layout 100B is a simplified version of layout 100A of FIG. 1A. As in FIG. 1A, in FIG. 1B, CLR=2. Accordingly, in layout 100B, each of M1 segments 120A, 120B, 122A and 122B, and each of the multiple instances of M1 segment 124, have been allotted to a corresponding one of two masking patterns/colors, namely a 'red' pattern/color and a 'green' pattern color. Among others, the red pattern/color includes M1 strap segments 120A and 122A. Among others, the green pattern/color includes M1 strap segments 120B and 122B.

Figure 5A:
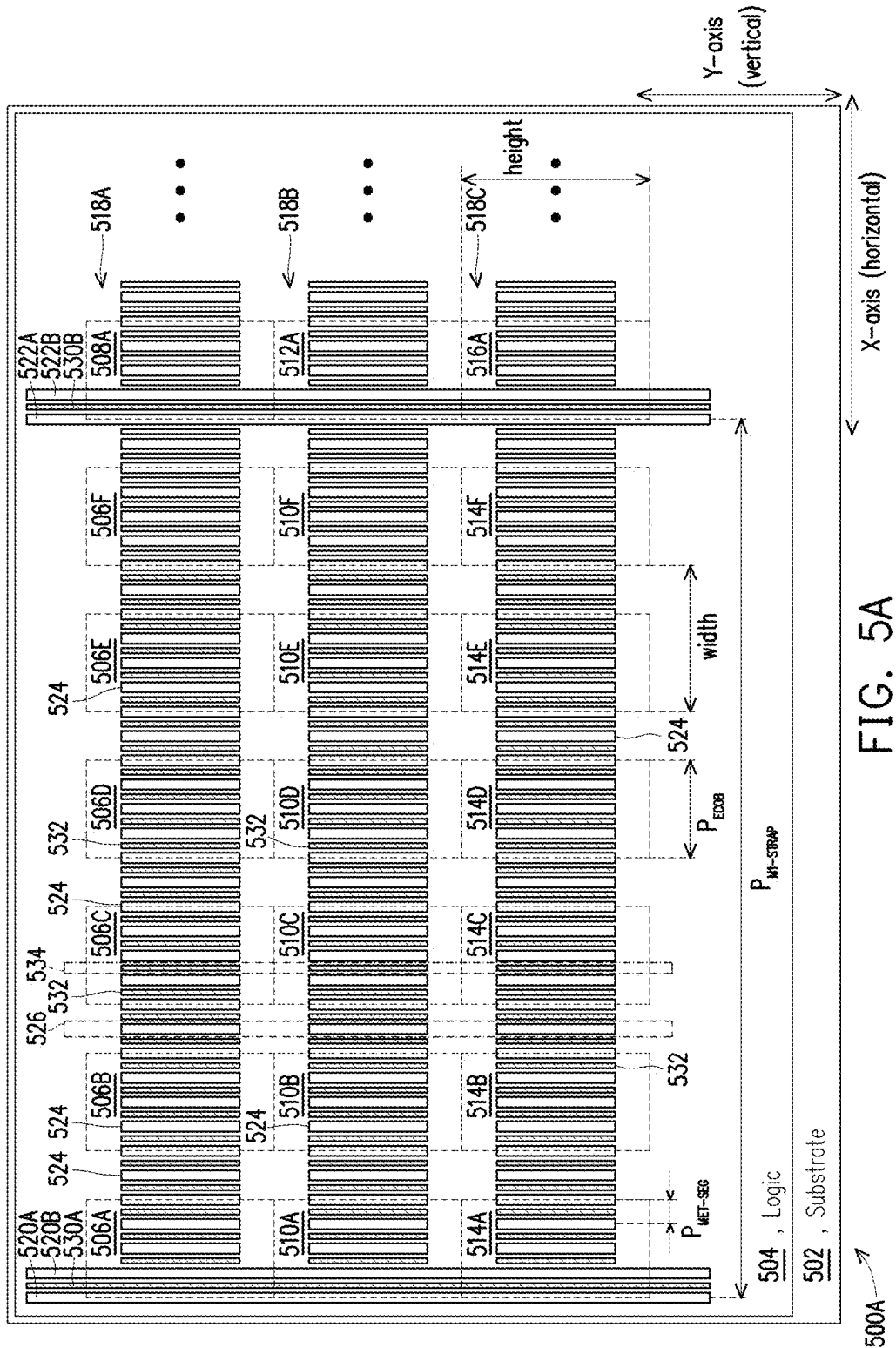
FIG. 5A is a layout, for a semiconductor device, of ECO base cells relative to line segments, in accordance with some embodiments.
Figure 5B:
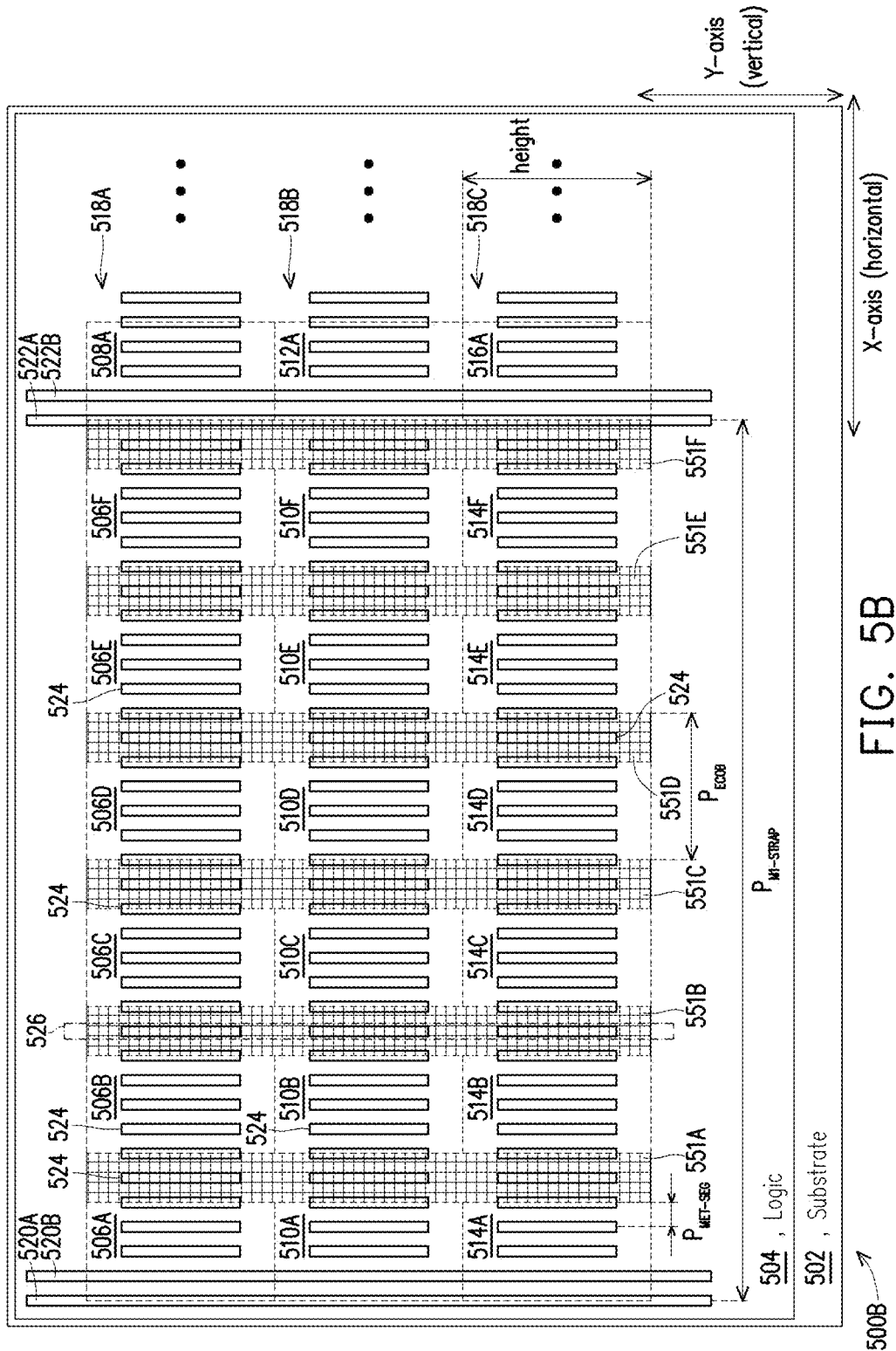
FIG. 5B is a simplified version of the layout of FIG. 5A, in accordance with some embodiments.
Figure 5C:
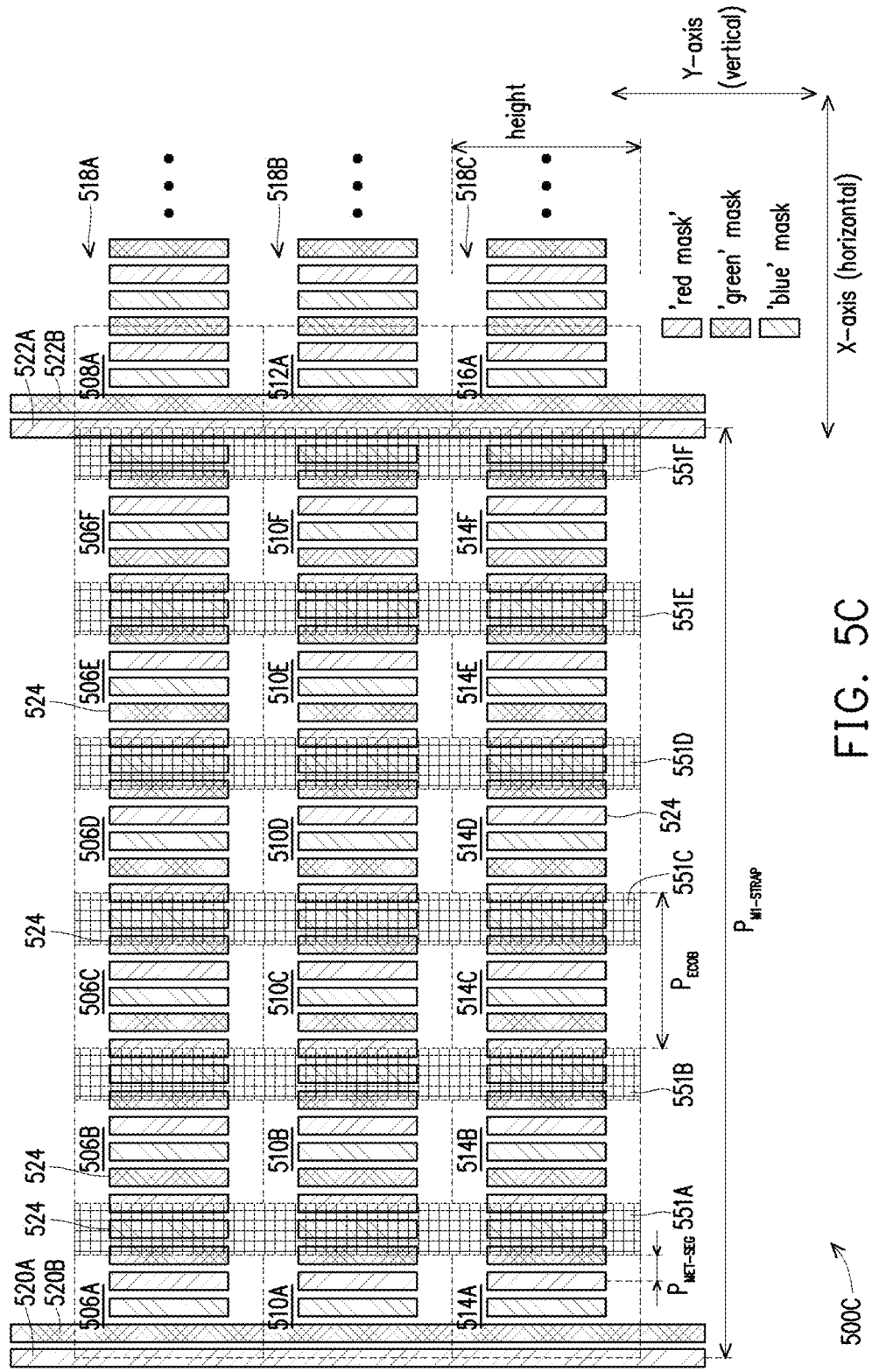
FIG. 5C is a simplified version of the layout of FIG. 5A, in accordance with some embodiments.

In addition to FIG. 1B, only FIG. 5C shows masking patterns/colors. The other figures do not show masking patterns/colors.

Returning to FIG. 1A, when placing ECO base cells into a row of a layout, it is desired to reduce gaps between adjacent ECO base cells. Such gaps represent wasted space. For example, a disadvantageous consequence of wasted space is that the transistor density of a semiconductor device is reduced. Also, placement of ECO base cells into a row of a layout is simplified if the ECO base cells are fixed not merely in height but also in width. In some embodiments, a library of standard cells includes sub-libraries of ECO base cells, where each sub-library includes ECO base cells of the same width as well as the same height.

In some embodiments, a pitch of the ECO base cells, $P_{ECOB}$ (or $P_{SPARE}$), is evenly divisible into the pitch of the M1 straps, $P_{M1\text{-}STRAP}$ (or more generally $P_{STRAP}$), such that pitch $P_{ECOB}$ is selected from a set, $\Theta$, of positive integer values, $\theta$, and $$P_{ECOB} \in \{\theta\}, \text{ where } 0 = P_{M1\text{-}STRAP} \bmod \theta \quad (1)$$

where $\{\Theta\}=\Theta$; $P_{M1\text{-}STRAP}$ and $P_{ECOB}$ are positive integers; and $2<\theta<P_{M1\_STRAP}$, and thus $P_{ECOB}<P_{M1\_STRAP}$. It is noted that an ECO base cell having $P_{ECOB}=3$ is the minimum width sufficient to form a transistor when the ECO base cell is programmed.

In some embodiments, pitch $P_{ECOB}$ of the ECO base cells is chosen to be the smallest member of the set $\Theta$, i.e., the smallest value of $\theta$, such that:

$$P_{ECOB} = \min\{\theta\} \quad (2)$$

In FIG. 1A, for simplicity of illustration, pitch $P_{M1\text{-}STRAP}=36$, pitch $P_{ECOB}=6$ and the number of ECO base cells between adjacent M1 straps (M1 segment pairs 120A & 120B and 122A & 122B) is shown as six (6). More particularly, pitch $P_{M1\text{-}STRAP}=36$ indicates that there are 36 M1 segments in the space between the start of one strap and the beginning of the next strap. For example, counting along the horizontal direction from left to right in FIG. 1A, there is a total of 36 M1 segments from M1 segment 120A through and including the rightmost instance of M1 segment 124 in, e.g., ECO base cell 106F. Pitch $P_{ECOB}=6$ indicates that there are 6 M1 segments in the space between the start of one ECO base cell and the beginning of the next ECO base cell. For example, counting along the horizontal direction from left to right in FIG. 1A, in any one of ECO base cells 106A-106F, 108A, 100A-110F, 112A, 114A-114 and 116A, there is a total of 6 M1 segments, e.g., counting from left to right in base cell 106A, there are six instances of M1 segment 124). The possible values for $\theta$ that satisfy Equation (1), i.e., the possible values of $\theta$ which divide evenly into $P_{M1\text{-}STRAP}$, are 1, 2, 3, 4, 6, 9, 12, 18 and 36, where the possible values are referred to as the set called $\Theta$, where each member of the set $\Theta$ is represented by the symbol $\theta$, and the set $\Theta$ is shown in set notation as $\Theta=\{\theta\}$, and more particularly $\Theta=\{\theta\}=\{1, 2, 3, 4, 6, 9, 12, 18, 36\}$, with $P_{ECOB}=\theta=6$ having been chosen for FIG. 1A. Other values for pitch $P_{M1\text{-}STRAP}$ and/or pitch $P_{ECOB}$ are contemplated, and thus other numbers of ECO base cells between adjacent M1 straps are contemplated as well.

EXAMPLE: As an example, assume that $P_{M1\text{-}STRAP}=30$. More particularly, pitch $P_{M1\text{-}STRAP}=30$ indicates that there are 30 M1 segments along the horizontal direction in the space between the start of one strap and the beginning of the next strap. The possible values for $\theta$ that satisfy Equation (1), i.e., the possible values of $\theta$ which divide evenly into $P_{M1\text{-}STRAP}$, are $\{\theta\}=\{1, 2, 3, 5, 6, 10, 15, 30\}$. Recalling that $2<\theta<P_{M1\text{-}STRAP}$, accordingly $\theta=1$, $\theta=2$ and $\theta=30$ must be discarded. Hence, $P_{ECOB}=\theta=3$ for the given Example. Pitch $P_{ECOB}=3$ indicates that there are 3 M1 segments along the horizontal direction in the space between the start of one ECO base cell and the beginning of the next ECO base cell.

In some embodiments, a reference edge of an ECO base cell aligns with a selected one of the masking patterns/colors. In some embodiments, the reference edge of each ECO base cell aligns with a center of the selected masking pattern/color. For example, in FIG. 1B, the reference edge of the ECO base cells is the left edge, and the left edge aligns with center of a corresponding portion of the 'red' mask color. In some embodiments, to achieve abutment when placing ECO base cells into a row of a layout and thereby avoid gaps between adjacent ECO base cells, pitch $P_{ECOB}$ of the ECO base cells is chosen to be consistent with the even/odd status of the number of masking patterns/colors CLR. Hereafter, the even/odd-status-matching pitch will be referred to as $PM_{ECOB}$. If CLR is even, i.e., if $0=CLR \bmod 2$, then the value selected for $PM_{ECOB}$ should be even. If CLR is odd, i.e., if $1=CLR \bmod 2$, then the value selected for $PM_{ECOB}$ should be odd. In FIGS. 1A-1B, pitch $P_{ECOB}$ is even ($P_{ECOB}=6$) and CLR is even (CLR=2) as noted, the left edge of each ECO base cell has been selected as the reference edge, and the red pattern has been selected for alignment with the reference edge of each ECO base cell. Because pitch $P_{ECOB}$ is even ($P_{ECOB}=6$) and CLR is even (CLR=2) rather than odd, there are no gaps between adjacent ECO base cells in FIGS. 1A-1B. In contrast, FIGS. 5A-5C (discussed below) show gaps between adjacent ECO base cells.

The values of $\theta$ which can satisfy the additional requirement of matching the even/odd status of CLR will be a subset of the set $\Theta$, i.e., a subset of $\{\theta\}$. To help distinguish the subset from $\{\theta\}$, the subset will be referred to as the set $\Delta$ of positive integer values, $\delta$, and where $\Delta \subset \Theta$, i.e., $\{\delta\} \subset \{\theta\}$. As such, pitch $PM_{ECOB}$ is:

$$PM_{ECOB} \in \Delta, \text{ where } \Delta = \{\delta\} \quad (3)$$

$$\{\delta\} = \begin{pmatrix} 0 = P_{M1\text{-}STRAP} \bmod \delta \\ \text{AND} \\ 0 = \delta \bmod CLR \end{pmatrix} \quad (4)$$

where $2<\delta<P_{M1\text{-}STRAP}$.

In some embodiments, $PM_{ECOB}$ is chosen to be the smallest member of the set $\Delta$ that matches the even/odd status of CLR, i.e., the smallest value of 6 that matches the even/odd status of CLR, such that:

$$PM_{ECOB} = \min\{\delta\} \quad (5)$$

EXAMPLE: As a variation of the above Example, in addition to assuming that $P_{M1\text{-}STRAP}=30$, also assume that the selected multiple OLE technique is a dual OLE technique such as in FIGS. 1A-1B such that CLR=2. Without taking into consideration the even/odd status of CLR, the possible values for θ that satisfy Equation (1), i.e., the possible values of θ which divide evenly into $P_{M1\text{-}STRAP}$ are 1, 2, 3, 5, 6, 10, 15 and 30, where the possible values are referred to as the set called Θ, where each member of the set Θ is represented by the symbol θ, and the set Θ is shown in set notation as Θ={θ}, and more particularly Θ={θ}={1, 2, 3, 5, 6, 10, 15, 30}. Here, however, the even/odd status of CLR is being taken into consideration. Here, CLR=2 and thus the even/odd status of CLR is even because 0=CLR mod 2=2 mod 2. As such, the subset of {θ}, namely {δ}, which satisfies Equation (4), i.e., for which all members match the even/odd status of CLR (here, CLR being even), is {δ}={2, 6, 10, 30}. Applying Equation (5), and recalling that $2<6<P_{M1\text{-}STRAP}$, accordingly δ=2 and δ=30 must be discarded. Hence, $PM_{ECOB}=6$ in the given Example.

EXAMPLE: As another variation of the first Example above, in addition to assuming that $P_{M1\text{-}STRAP}=30$, also assume that the selected multiple OLE technique is a triple OLE technique such that CLR=3. Without taking into consideration the even/odd status of CLR, the possible values for θ that satisfy Equation (2), i.e., the possible values of θ which divide evenly into $P_{M1\text{-}STRAP}$ are {θ}={1, 2, 3, 5, 6, 10, 15, 30}. Here, however, the even/odd status of CLR is being taken into consideration. Here, CLR=3 and thus the even/odd status of CLR is odd because 1=CLR mod 2=3 mod 2. As such, the subset of {θ}, namely {δ} which satisfies Equation (4), i.e., for which all members match the even/odd status of CLR (here, CLR being odd), is {δ}={1, 3, 5, 15}. Applying Equation (5), and recalling that $2<\delta<P_{M1\text{-}STRAP}$, accordingly δ=1 is discarded. Hence, $PM_{ECOB}=3$ in the given Example.

FIG. 1C is a layout 100C, corresponding to layout 100A, showing reserved regions in the ECO base cells, in accordance with some embodiments.

When a given quantity of M1 segments in an ECO base cell is reserved for a particular purpose, then the given quantity of M1 segments are usable for the particular purpose. For example, reserving the given quantity of M1 segments in an ECO base cell for a strap indicates that the given quantity of M1 segments will be used for a strap.

When a region in an ECO base cell is reserved for a particular purpose, then the M1 segments in the reserved region are usable for the particular purpose. For example, reserving a region in an ECO base cell for a strap indicates that M1 segments in the reserved region will be used for a strap. In some embodiments, the same region in each ECO base cell is reserved for the same purpose.

Layout 100C is a simplified version of layout 100A of FIG. 1A albeit one in which a reserved region and an unreserved region in each ECO base cell has been indicated. In some embodiments, relative to the M1 layer, all of the ECO base cells in a library of standard cells are arranged to reserve the same number of one or more M1 segments for use as M1 strap segments. Though not every ECO base will have an M1 strap routed through the ECO base cell, nevertheless reserving the same number of M1 segments in each ECO base cell simplifies placing any given ECO base cell into a row of a layout.

In some embodiments, in addition to reserving the same number of M1 segments, each ECO base cell in a library of standard cells allots the same region within the cell to be the region in which the reserved number of M1 segments are located. Reserving the same region in each ECO base cell for M1 segments further simplifies placing any given ECO base cell into a row of a layout because, e.g., it eliminates the possible conflict that might otherwise occur if M1 segments that were intended for non-strap purposes are then also needed for use as strap segments.

In FIG. 1C, the reserved regions are left-edge aligned. More particularly, reserved regions 140A, 140B, 140C, 140D, 140E and 140F (140A-140F), 144A, 150A-150F, 154A, 160A-160F and 164A are located in corresponding ECO base cells 106A-106F, 108A, 110A-110F, 112A, 114A-114F and 116A. Left edges of reserved regions 140A, 140B, 140C, 140D, 140E and 140F (140A-140F), 144A, 150A-150F, 154A, 160A-160F and 164A are aligned with left edges of corresponding ECO base cells 106A-106F, 108A, 110A-110F, 112A, 114A-114F and 116A. The M1 segments in reserved regions 140A-140F, 144A, 150A-150F, 154A, 160A-160F and 166A are intended for use as M1 strap segments.

Also, in ECO base cells 106A-106F, 108A, 110A-110F, 112A, 114A-114F and 116A, corresponding regions 142A-142F, 146A, 152A-152F, 156A, 162A-162F and 166A are unreserved regions. None of unreserved regions 142A-142F, 146A, 152A-152F, 156A, 162A-162F and 166A is divided in two parts by corresponding reserved regions 140A, 140B, 140C, 140D, 140E and 140F (140A-140F), 144A, 150A-150F, 154A, 160A-160F and 164A.

The M1 segments in unreserved regions 142A-142F, 146A, 152A-152F, 156A, 162A-162F and 166A are intended for use as M1 non-strap segments. In FIG. 1C, corresponding ones of the multiple instances of M1 segment 124 (not shown in FIG. 1C, but see FIGS. 1A-1B) are located in unreserved regions 142A-142F, 146A, 152A-152F, 156A, 162A-162F and 166A.

Figure 2:
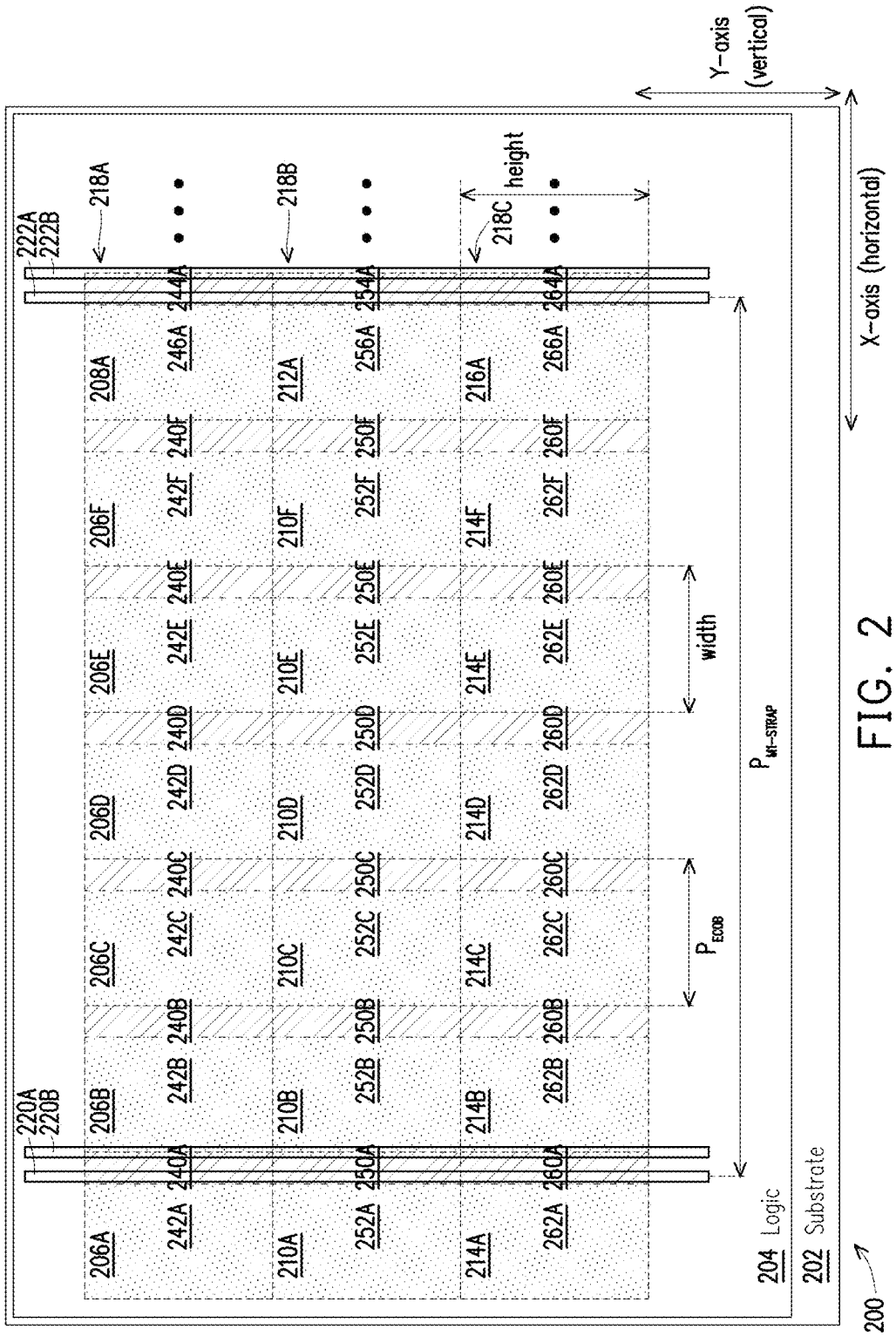
FIG. 2 is a layout, for a semiconductor device, of reserved regions in the ECO base cells, in accordance with some embodiments.

FIG. 2 is a layout 200, for a semiconductor device, showing reserved regions in the ECO base cells, in accordance with some embodiments.

Layout 200 is a variation of layout 100C of FIG. 1C. In some embodiments, the M(i) layer is M1. In FIG. 2, M(i) is M1. Similar to FIGS. 1A-1C, in FIG. 2 (as an example), pitch $P_{M1\text{-}STRAP}=36$, pitch $P_{ECOB}=6$, CLR=2 and the number of ECO base cells between adjacent M1 straps (M1 segment pairs 120A & 120B and 122A & 122B) is shown as six (6).

In FIG. 2, the reserved regions are right-edge aligned, whereas FIG. 1C shows left-edge alignment. More particularly, in FIG. 2, reserved regions 240A-240F, 244A, 250A-250F, 254A, 260A-260F and 264A are located in corresponding ECO base cells 206A-206F, 208A, 210A-210F, 212A, 214A-214F and 216A. Right edges of reserved regions 240A-240F, 244A, 250A-250F, 254A, 260A-260F and 264A are aligned with right edges of corresponding ECO base cells 206A-206F, 208A, 210A-210F, 212A, 214A-214F and 216A. The M1 segments in reserved regions 240A-240F, 244A, 250A-250F, 254A, 260A-260F and 266A are intended for use as M1 strap segments.

In FIG. 2, M1 strap segments 220A and 220B represent a first M1 strap and are located in reserved regions 240A, 250A and 260A. M1 strap segments 222A and 222B represent a second M1 strap segment and are located in reserved regions 244A, 254A and 264A. In some embodiments, the first M1 strap (represented by M1 strap segments 220A and 220B) is connected to the system voltage, VDD, and the second M1 strap (represented by M1 strap segments 222A and 222B) is connected to the system ground, VSS.

Also, in ECO base cells 206A-206F, 208A, 210A-210F, 212A, 214A-214F and 216A, corresponding regions 242A-242F, 246A, 252A-252F, 256A, 262A-262F and 266A are unreserved regions. None of the reserved regions 242A-242F, 246A, 252A-252F, 256A, 262A-262F and 266A is divided into two parts by corresponding reserved regions 240A-240F, 244A, 250A-250F, 254A, 260A-260F and 264A. The M1 segments in unreserved regions 242A-242F, 246A, 252A-252F, 256A, 262A-262F and 266A are intended for use as M1 non-strap segments.

Figure 3A:
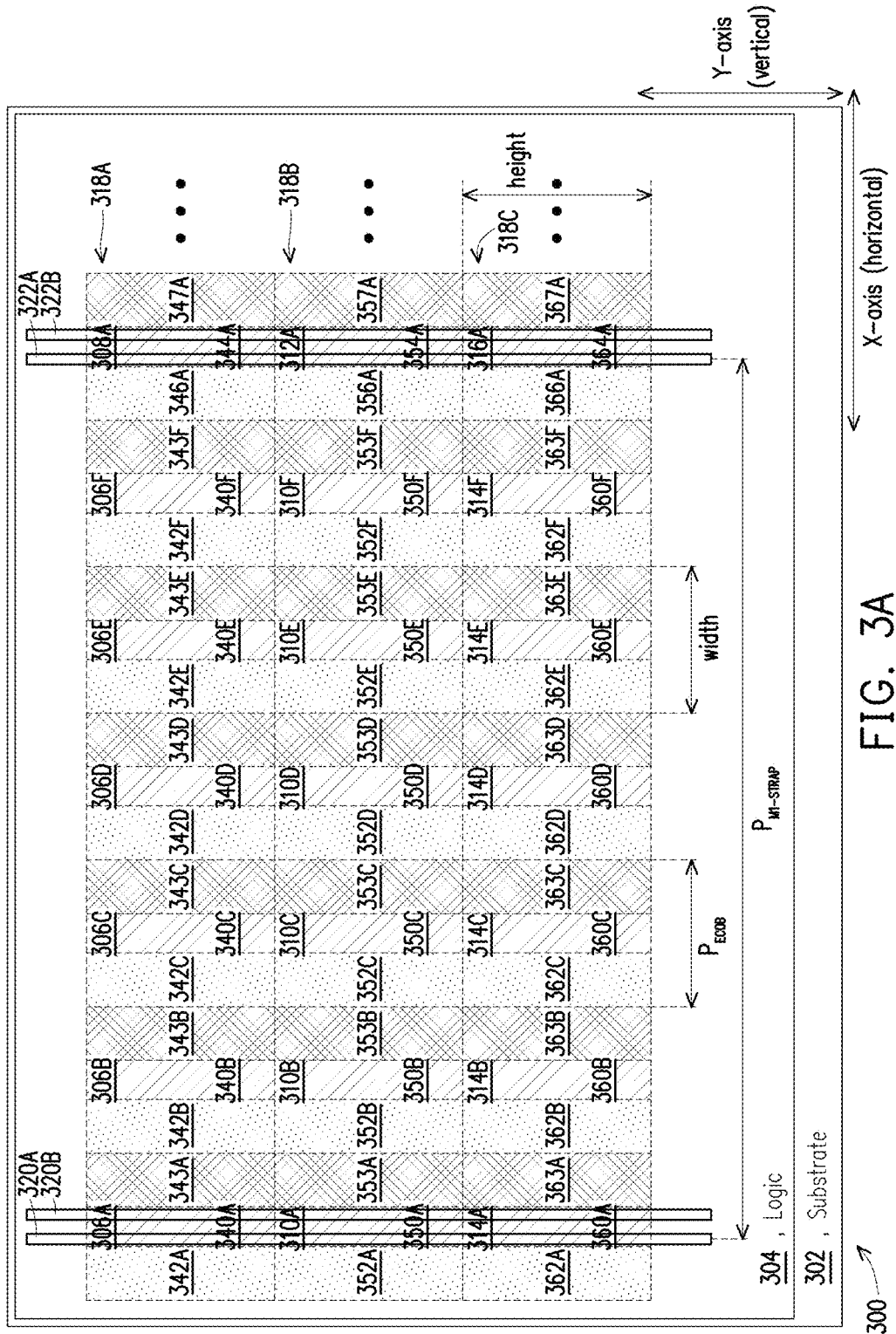
FIG. 3A is another layout, for a semiconductor device, of reserved regions in the ECO base cells, in accordance with some embodiments.
Figure 3B:
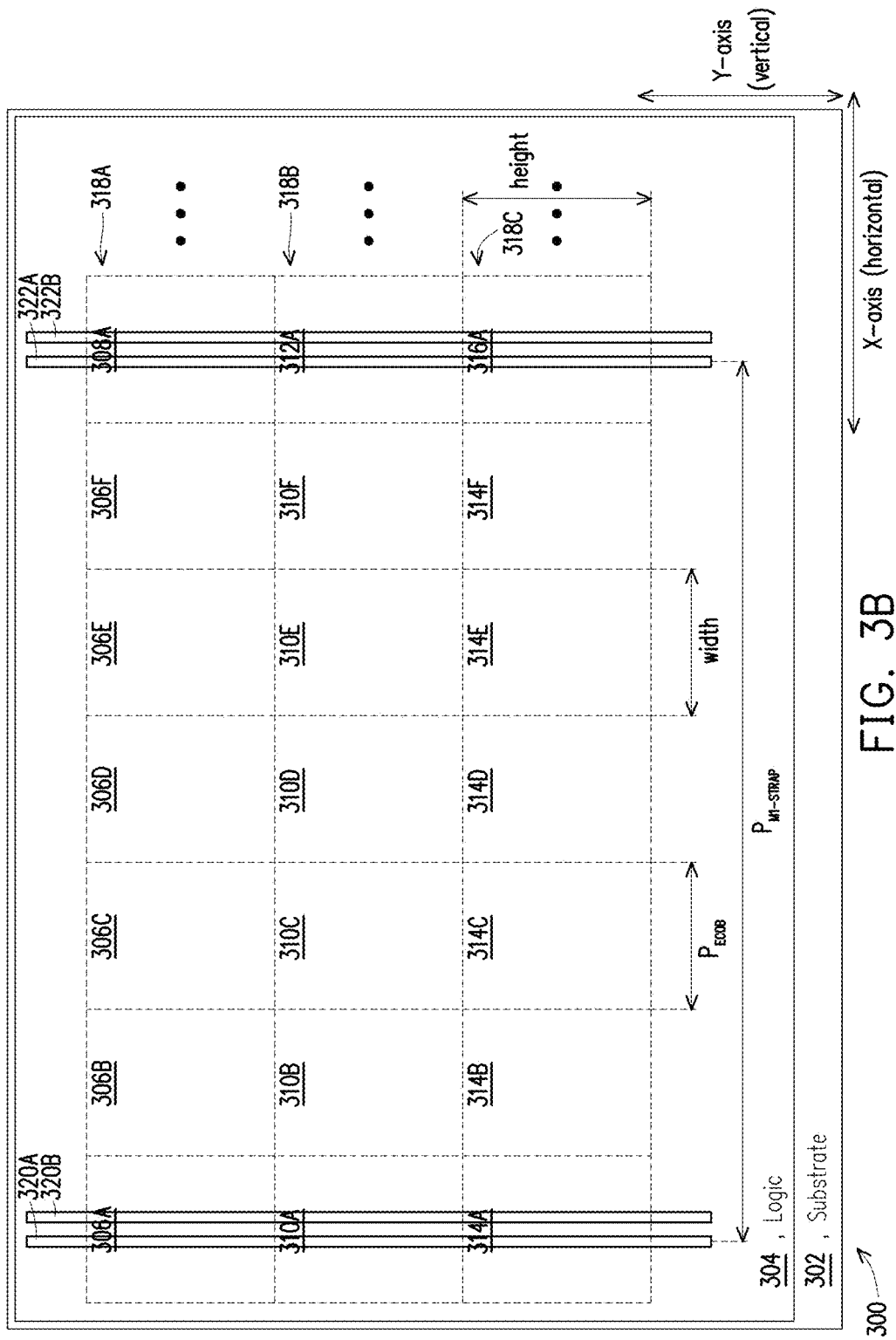
FIG. 3B is a simplified version of the layout of FIG. 3A, in accordance with some embodiments.
Figure 3C:
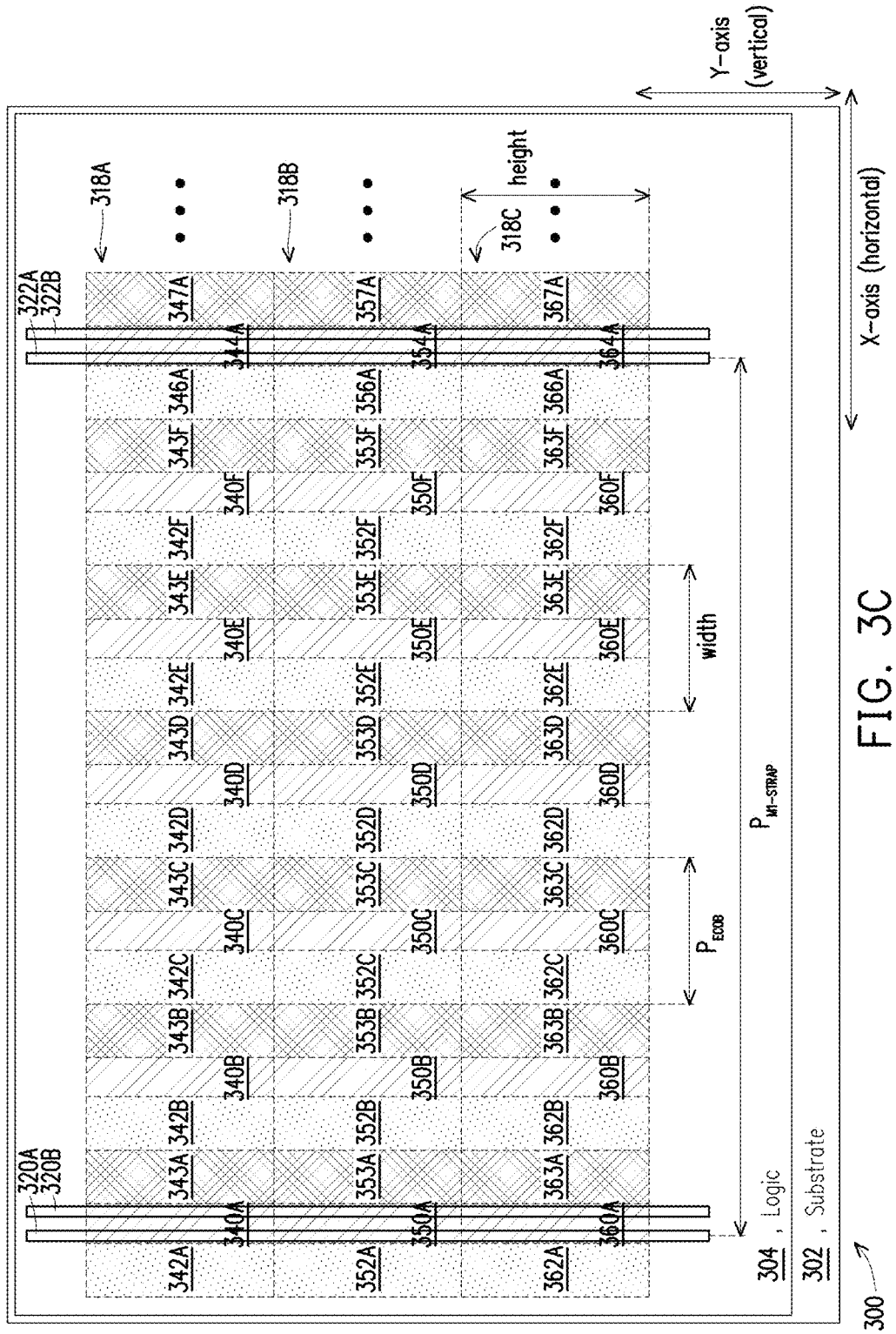
FIG. 3C is another simplified version of the layout of FIG. 3A, in accordance with some embodiments.

FIG. 3A is a layout 300, for a semiconductor device, showing reserved regions in the ECO base cells, in accordance with some embodiments. FIG. 3B is simplified version of layout 300 in which the reserved and unreserved regions are not shown, in accordance with some embodiments. FIG. 3C is simplified version of layout 300 in which the ECO base cells are not shown, in accordance with some embodiments.

In some embodiments, the M(i) layer is M1. In FIGS. 3A-3C, M(i) is M1. Similar to FIGS. 1A-1C, in FIG. 2 (as an example), pitch $P_{M1\text{-}STRAP}=36$, pitch $P_{ECOB}=6$, CLR=2 and the number of ECO base cells between adjacent M1 straps (M1 segment pairs 120A & 120B and 122A & 122B) is shown as six (6).

Layout 300 is a variation of layout 100C of FIG. 1C. In FIGS. 3A-3C, the reserved regions are centered in the ECO base cells, whereas FIG. 1A shows left-edge alignment and FIG. 2 shows right-edge alignment. More particularly, reserved regions 340A-340F, 344A, 350A-350F, 354A, 360A-360F and 364A are horizontally centered in corresponding ECO base cells 306A-306F, 308A, 310A-310F, 312A, 314A-314F and 316A. The M1 segments in reserved regions 340A-340F, 344A, 350A-350F, 354A, 360A-360F and 366A are intended for use as M1 strap segments.

In FIGS. 3A-3C, M1 strap segments 320A and 320B represent a first M1 strap and are located in reserved regions 340A, 350A and 360A. M1 strap segments 322A and 322B represent a second M1 strap segment and are located in reserved regions 344A, 354A and 364A. In some embodiments, the first M1 strap (represented by M1 strap segments 320A and 320B) is connected to the system voltage, VDD, and the second M1 strap (represented by M1 strap segments 322A and 322B) is connected to the system ground, VSS.

As a result of the centering, each ECO base cell in FIGS. 3A-3C has two unreserved regions, namely a left side unreserved region and a right side unreserved region. In ECO base cells 306A-306F, 308A, 310A-310F, 312A, 314A-314F and 316A, there are: corresponding left side regions 342A-342F, 346A, 352A-352F, 356A, 362A-362F and 366A which are unreserved regions; and corresponding right side regions 343A-343F, 347A, 353A-353F, 357A, 363A-363F and 367A which are unreserved regions. The M1 segments in unreserved regions 342A-342F, 343A-343F, 346A, 347A, 352A-352F, 353A-353F, 356A, 357A, 362A-362F, 363A-363F, 366A and 367A are intended for use as M1 non-strap segments.

Figure 4A:
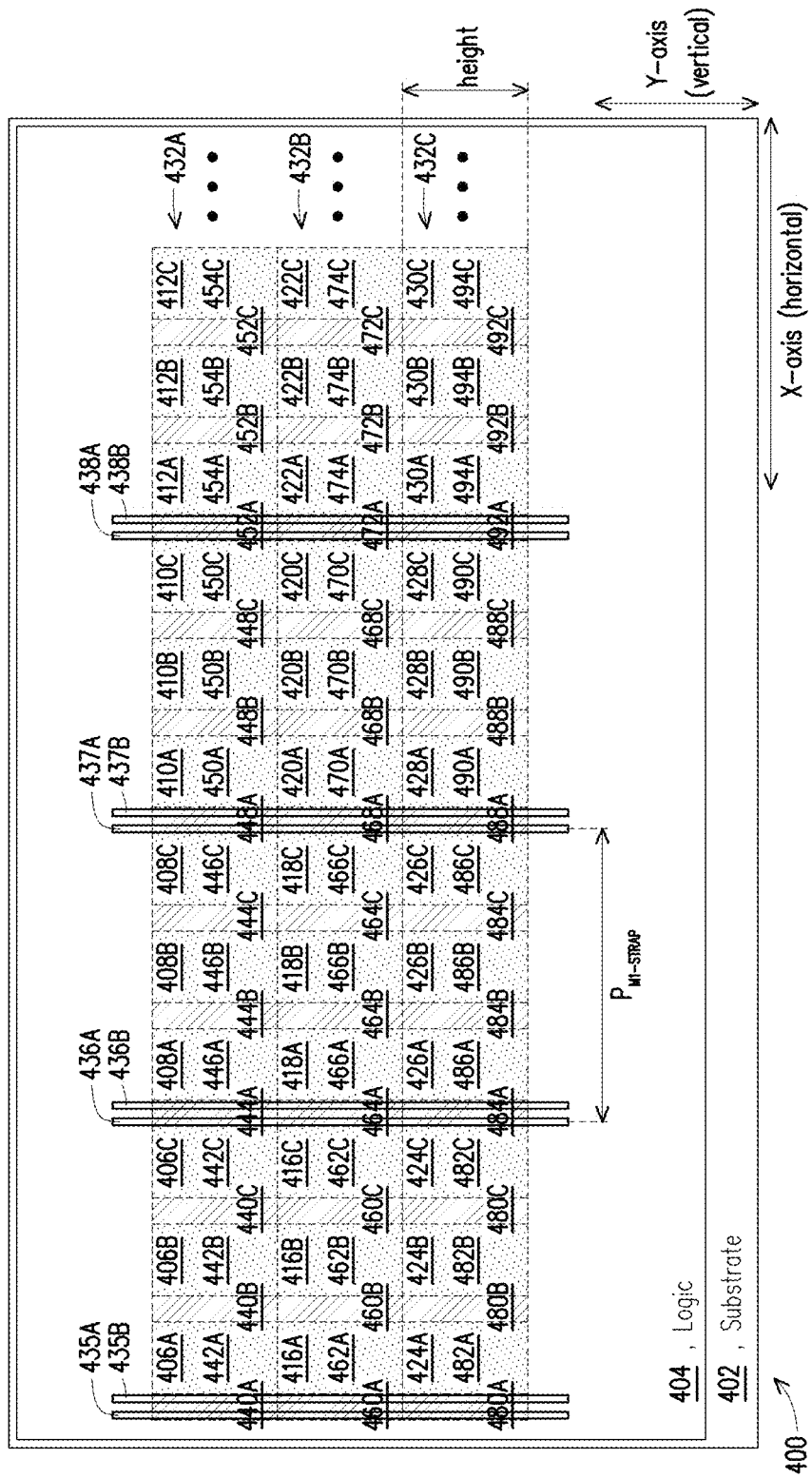
FIG. 4A is a layout, for a semiconductor device, of ECO base cells relative to line segments, in accordance with some embodiments.
Figure 4B:
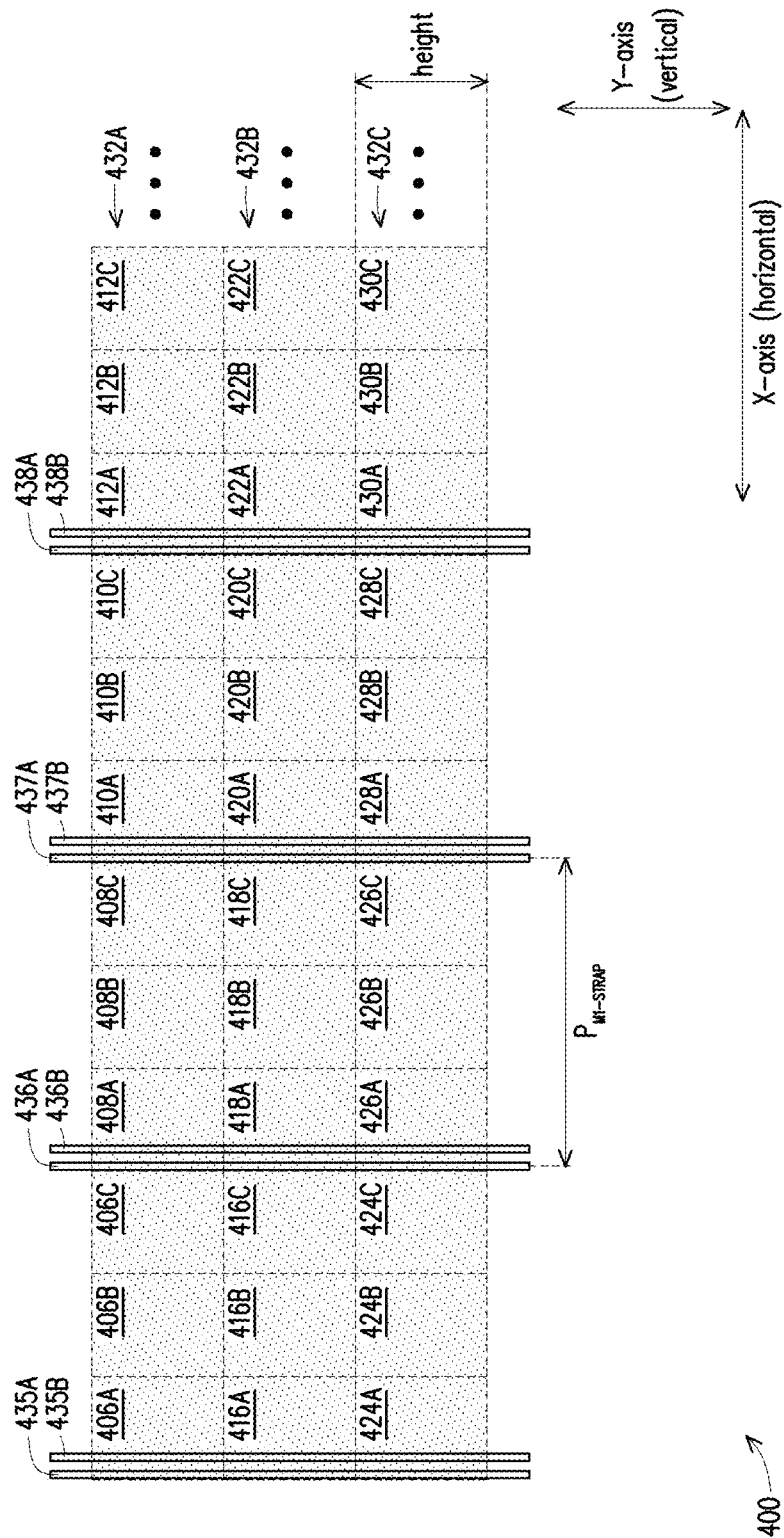
FIG. 4B is a simplified version of the layout of FIG. 4A, in accordance with some embodiments.
Figure 4C:
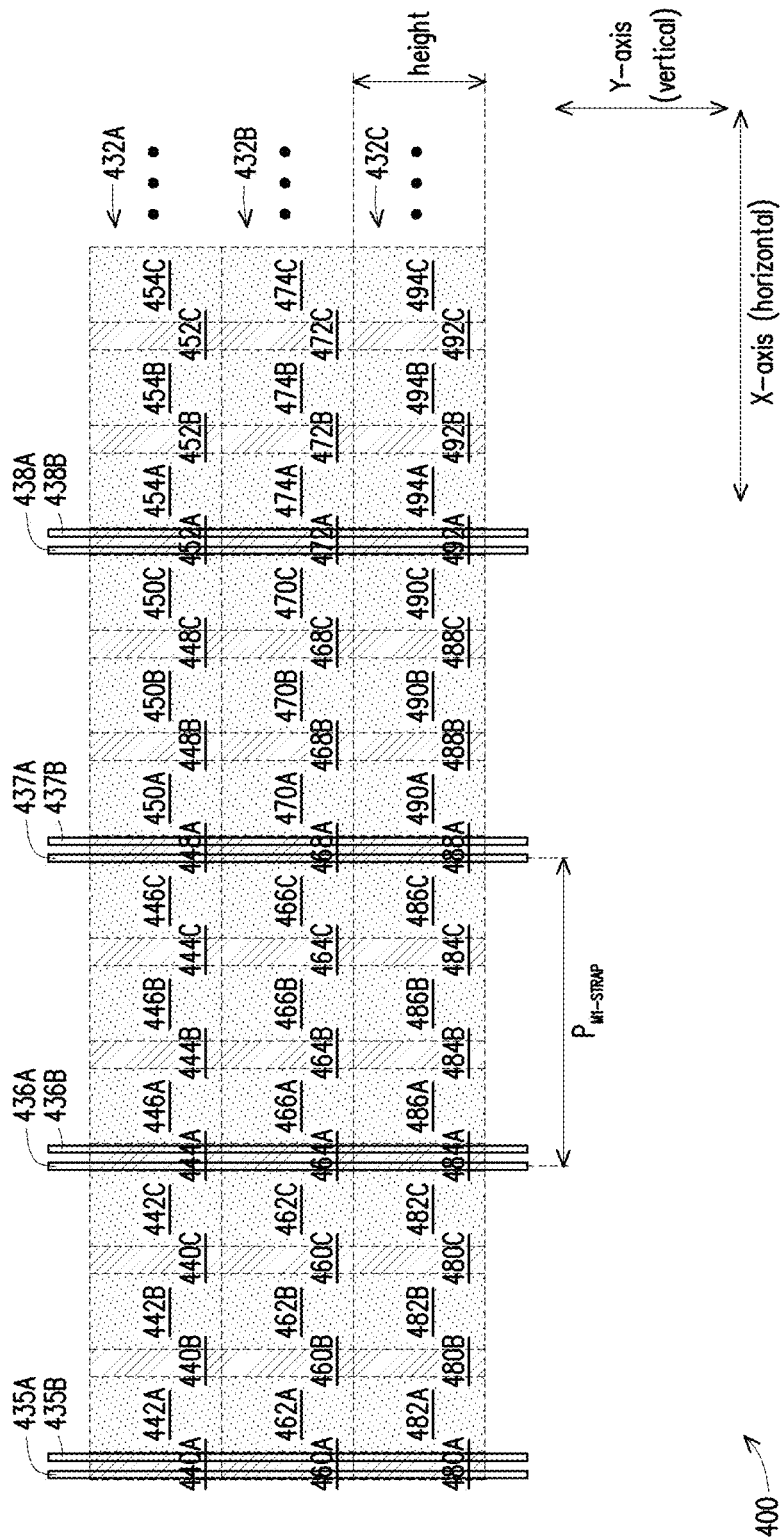
FIG. 4C is another simplified version of the layout of FIG. 4A, in accordance with some embodiments.

FIG. 4A is a layout 400, for a semiconductor device, of ECO base cells relative to line segments in an $i^{th}$ metallization layer, M(i), in accordance with some embodiments. FIG. 4B is a simplified version of layout 400 in which the reserved and unreserved regions are not shown, in accordance with some embodiments. FIG. 4C is simplified version of layout 400 in which the ECO base cells are not shown, in accordance with some embodiments.

In some embodiments, the M(i) layer is M1. In FIGS. 4A-4C, M(i) is M1.

FIGS. 4A-4C show a different pitch $P_{ECOB}$ relative to pitch $P_{M1\text{-}STRAP}$ as contrasted with, e.g., FIGS. 1A-1C. Layout 400 is a variation of layout 100A of FIG. 1A. In FIGS. 4A-4C, the number of ECO base cells between adjacent M1 straps is shown as three (3). In some embodiments, in FIGS. 4A-4C, pitch $P_{M1\text{-}STRAP}=36$, pitch $P_{ECOB}=10$ and CLR=2. More particularly, pitch $P_{M1\text{-}STRAP}=36$ indicates that there are 36 M1 segments along the horizontal direction in the space between the start of one strap and the beginning of the next strap. For simplicity of illustration, while M1 segments 435A-435B, 436A-436B, 437A-437B and 438A-438B are shown in FIGS. 4A-4C, other M1 segments are not shown. Pitch $P_{ECOB}=10$ indicates that there are 10 M1 segments along the horizontal direction in the space between the start of one ECO base cell and the beginning of the next ECO base cell.

Similar to FIG. 1A, the reserved regions in FIGS. 4A and 4C are left-edge aligned. More particularly, reserved regions 440A-440C, 444A-444C, 448A-448C, 452A-452C, 460A-460C, 464A-464C, 468A-468C, 472A-472C, 480A-480C, 484A-484C, 488A-488C and 492A-492C are located in corresponding ECO base cells 406A-406C, 408A-408C, 410A-410C, 412A-412C, 416A-416C, 418A-418C, 420A-420C, 422A-422C, 424A-424C, 426A-426C, 428A-428C and 430A-430C.

Left edges of reserved regions 440A-440C, 444A-444C, 448A-448C, 452A-452C, 460A-460C, 464A-464C, 468A-468C, 472A-472C, 480A-480C, 484A-484C, 488A-488C and 492A-492C are aligned with left edges of corresponding ECO base cells 406A-406C, 408A-408C, 410A-410C, 412A-412C, 416A-416C, 418A-418C, 420A-420C, 422A-422C, 424A-424C, 426A-426C, 428A-428C and 430A-430C. The M1 segments in reserved regions 440A-440C, 444A-444C, 448A-448C, 452A-452C, 460A-460C, 464A-464C, 468A-468C, 472A-472C, 480A-480C, 484A-484C, 488A-488C and 492A-492C are intended for use as M1 strap segments.

Also, in ECO base cells 406A-406C, 408A-408C, 410A-410C, 412A-412C, 416A-416C, 418A-418C, 420A-420C, 422A-422C, 424A-424C, 426A-426C, 428A-428C and 430A-430C, corresponding regions 442A-442C, 446A-446C, 450A-450C, 454A-454C, 462A-462C, 466A-46C, 470A-470C, 474A-474C, 482A-482C, 486A-486C, 490A-490C and 494A-494C are unreserved regions.

The M1 segments in reserved regions 440A, 460A and 480A are intended for use as corresponding M1 strap segments 435A-435B. The M1 strap segments in reserved regions 444A, 464A and 484A are intended for use as corresponding M1 strap segments 436A-436B. The M1 segments in reserved regions 448A, 468A and 488A are intended for use as corresponding M1 strap segments 437A-437B. The M1 segments in reserved regions 452A, 472A and 492A are intended for use as corresponding M1 strap segments 438A-438B.

FIG. 5A is a layout 500A, for a semiconductor device, of ECO base cells relative to line segments in an $i^{th}$ metallization layer, M(i), in accordance with some embodiments. FIG. 5B is layout 500B, which is a simplified version of layout 500A albeit also showing wasted space, in accordance with some embodiments.

FIG. 5C is a layout 500C, which is simplified version of layout 500A albeit also showing wasted space and allotment of each metallization segment to a corresponding masking pattern/color, in accordance with some embodiments. In addition to FIG. 5C, FIG. 1B shows masking patterns/colors. The other figures do not show masking patterns/colors.

In some embodiments, the M(i) layer is M1. In FIGS. 5A-5C, M(i) is M1. Layout 500 is a variation of layout 100 of FIG. 1A. In FIGS. 5A-5C, the reserved regions (not shown) are left-edge aligned with left-edges of ECO base cells 506A-506D, 508A, 510A-510D, 512A, 514A-514D and 516A.

In some embodiments, layout 500A is formed using a multiple OLE technique. In some embodiments, layout 500A is formed using a multiple OLE technique in which CLR is an even number. In some embodiments, layout 500A is formed using a dual OLE technique, where CLR=2. In some embodiments, layout 500A is formed using a multiple OLE technique in which CLR is an odd number. In some embodiments, layout 500A is formed using a triple OLE technique, where CLR=3. It is noted that FIGS. 5A-5C assume a circumstance in which a triple OLE technique is used, i.e., CLR=3.

In FIGS. 5A-5C, for simplicity of illustration, pitch $P_{M1\text{-}STRAP}$=36, pitch $P_{ECOB}$=4, and the number of ECO base cells between adjacent M1 straps is shown as six (6). More particularly, pitch $P_{M1\text{-}STRAP}$=36 indicates that there are 36 M1 segments along the horizontal direction in the space between the start of one strap and the beginning of the next strap. Pitch $P_{ECOB}$=4 indicates that there are 4 M1 segments along the horizontal direction in the space between the start of one ECO base cell and the beginning of the next ECO base cell. The possible values for θ that satisfy Equation (1), i.e., the possible values of θ which divide evenly into $P_{M1\text{-}STRAP}$ are {θ}={1, 2, 3, 4, 6, 9, 12, 18, 36}, with $P_{ECOB}$=θ=4 having been chosen for FIGS. 5A-5C. Recalling that 2<θ<$P_{M1\text{-}STRAP}$, accordingly θ=1, θ=2 and θ=36 must be discarded. Other values for pitch $P_{M1\text{-}STRAP}$, pitch $P_{ECOB}$ and/or CLR are contemplated, and thus other numbers if ECO base cells between adjacent M1 straps are contemplated as well. In FIGS. 5A-5C, pitch $P_{ECOB}$ is even ($P_{ECOB}$=4), CLR is odd (CLR=3), the left edge of each ECO base cell has been selected as the reference edge, and the red pattern (FIG. 5C) has been selected for alignment with the reference edge of each ECO base cell. The possible values for δ that satisfy Equation (4), i.e., the possible values of δ which divide evenly into $P_{M1\text{-}STRAP}$ AND which are evenly divisible by CLR (CLR=3) are {δ}={3, 6, 9, 12, 18, 36}. Recalling that 2<δ<$P_{M1\text{-}STRAP}$, accordingly δ=36 must be discarded. While θ=4 is valid relative to Equation (1), δ≠4 for Equation (4) because 0=δ mod CLR would NOT be true, i.e., 0≠4 mod 3, rather 1=4 mod 3. Because of the even/odd mismatch, i.e., because pitch $P_{ECOB}$ is even ($P_{ECOB}$=4) and CLR is odd (CLR=3), FIGS. 5B-5C show: a gap 551A between ECO base cells 506A, 510A and 514A and corresponding ECO base cells 506B, 510B and 514B; a gap 551B between ECO base cells 506B, 510B and 514B and corresponding ECO base cells 506C, 510C and 514C; a gap 551C between ECO base cells 506C, 510C and 514C and corresponding ECO base cells 506D, 510D and 514D; a gap 551D between ECO base cells 506D, 510D and 514D and corresponding ECO base cells 506E, 510E and 514E; a gap 551E between ECO base cells 506E, 510E and 514E and corresponding ECO base cells 506F, 510F and 514F; and a gap 551F between ECO base cells 506F, 510F and 514F and corresponding ECO base cells 508A, 512A and 516A.

Figure 6A:
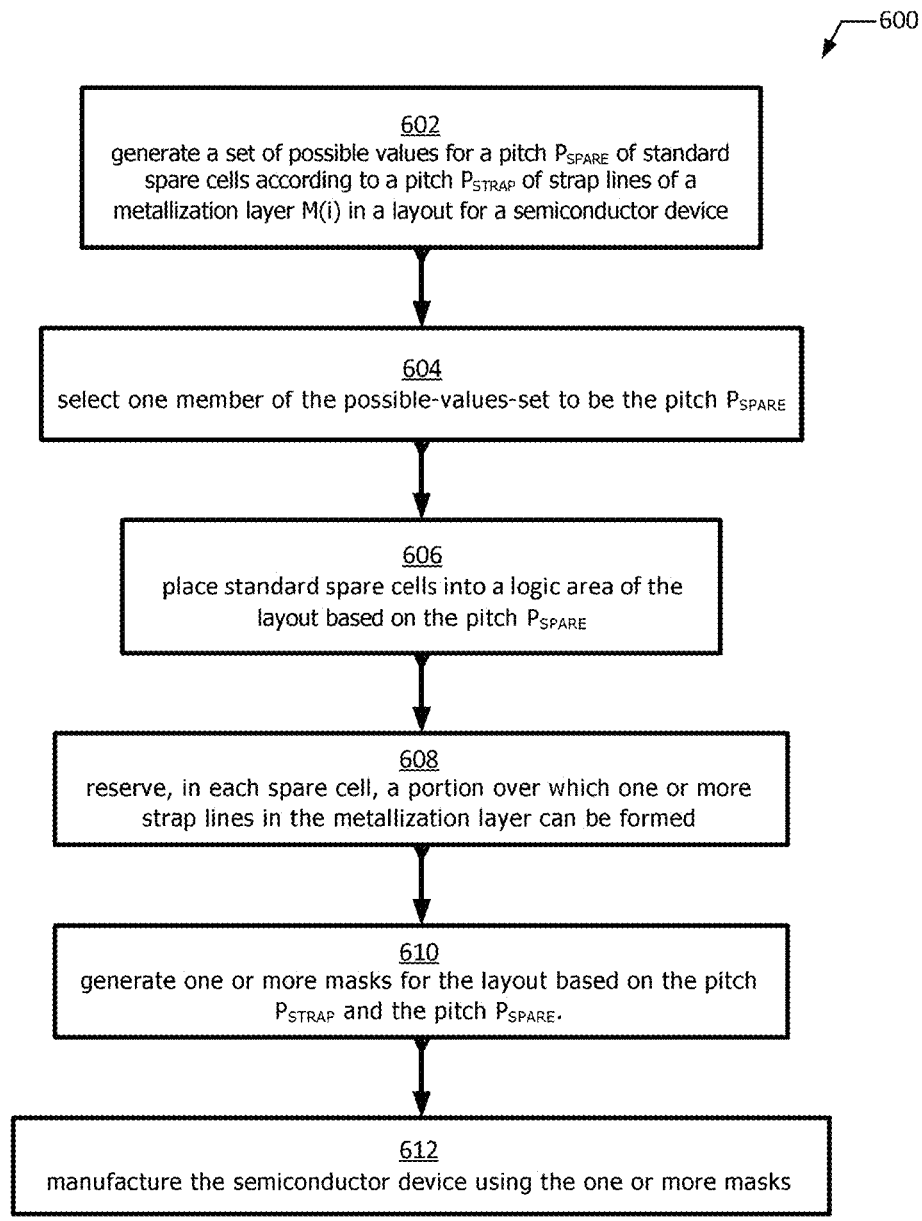
FIG. 6A is a flowchart of a method of designing, for a semiconductor device, a layout, in accordance with some embodiments.

FIG. 6A is a flowchart of a method 600 of designing, for a semiconductor device, a layout which includes standard spare cells, in accordance with some embodiments.

In FIG. 6A, at block 602, a set of possible values for a pitch $P_{SPARE}$ of standard spare cells is generated based on the pitch $P_{STRAP}$ of strap lines of a metallization layer M(i) in a layout for a semiconductor device. In some embodiments, M(i) is M1. Details of block 602 are explained with reference to FIG. 6B. From block 602, flow proceeds to a block 604. At block 604, one member of the possible-values-set is selected to be the pitch $P_{SPARE}$. Details of block 604 are explained with reference to FIG. 6C. From block 604, flow proceeds to a block 606. At block 606, standard spare cells are placed into a logic area of the layout according to the pitch $P_{SPARE}$. From block 606, flow proceeds to a block 608.

At block 608, in each spare cell, a portion is reserved/selected to be a reserved-portion, wherein one or more of the strap lines can be formed over the reserved-portion. In some embodiments, each reserved-portion extends across the spare cell. Details of block 608 are explained with reference to FIG. 6D. From block 608, flow proceeds to a block 610. At block 610, one or more masks for the layout are generated based on the pitch $P_{STRAP}$ and the pitch $P_{SPARE}$. From block 610, flow proceeds to a block 612. At block 612, the semiconductor device is manufactured using the one or more masks.

Figure 6B:
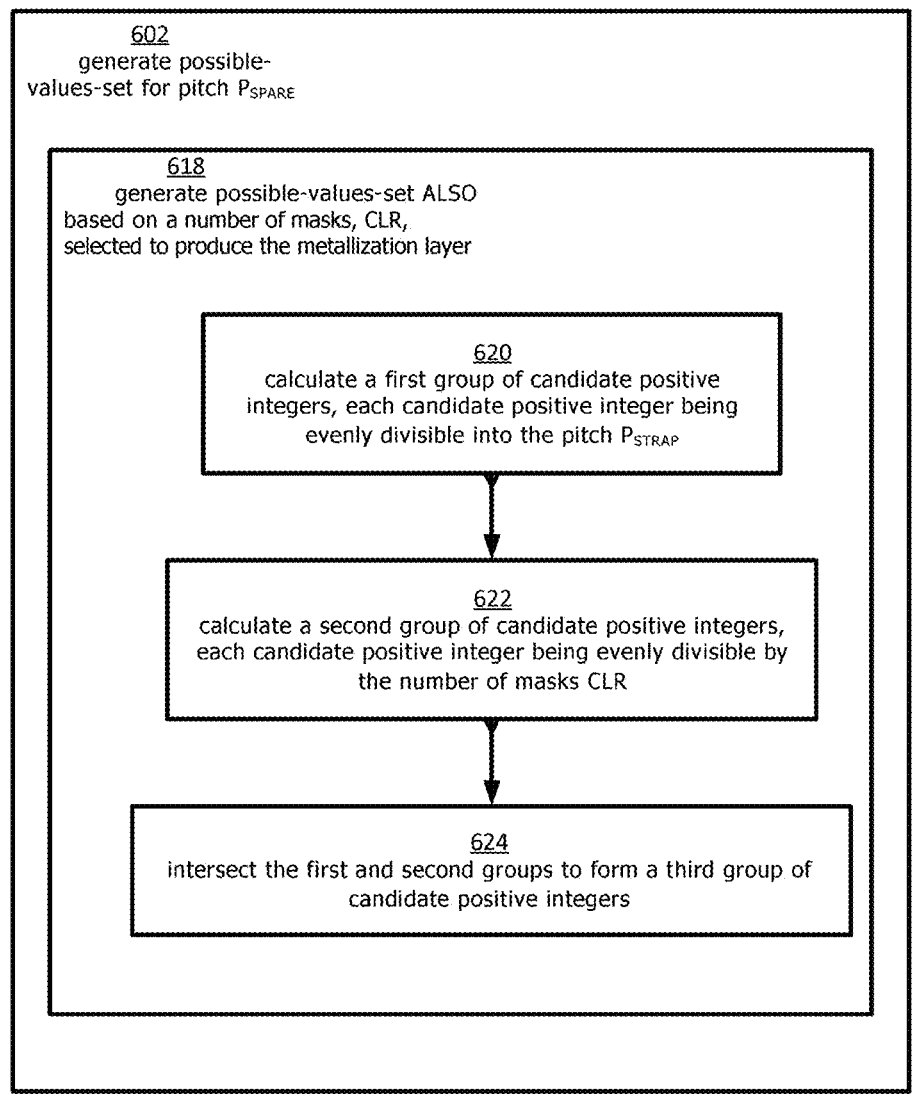
FIG. 6B is a detailed view of a block in the flowchart of FIG. 6A, in accordance with some embodiments.

FIG. 6B is a more detailed view of block 602 in method 600, in accordance with some embodiments.

In FIG. 6B, block 602 includes a block 618. At block 618, the set of possible values for the pitch $P_{SPARE}$ is also generated based on a number of masks, CLR, which have been selected to produce the metallization layer. Details of block 618 are explained with reference to blocks 620-624.

Block 618 includes blocks 620-624. At block 620, a first group of candidate positive integers is calculated, each member of the first group being a positive integer being evenly divisible into the pitch $P_{STRAP}$. From block 620, flow proceeds to a block 622. At block 622, a second group of candidate positive integers is calculated, each member of the second group being evenly divisible by the number of masks CLR. From block 622, flow proceeds to a block 624. At block 624, the first and second groups are intersected to form a third group of positive candidate integers. The third group represents the set of possible values for a pitch $P_{SPARE}$ of standard spare cells.

Figure 6C:
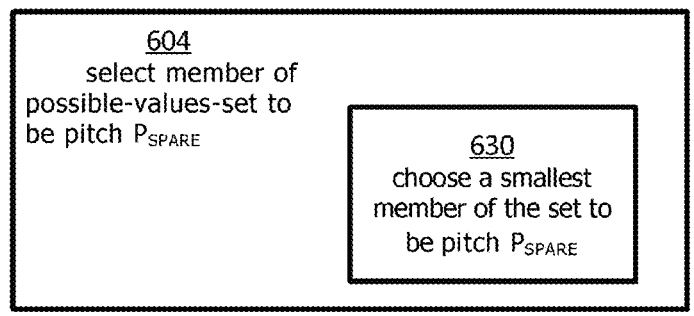
FIG. 6C is a detailed view of another block in the flowchart of FIG. 6A, in accordance with some embodiments.

FIG. 6C is a further detailed view of block 604 in method 600, in accordance with some embodiments.

In FIG. 6C, at block 630, a smallest member of the set of possible values for a pitch $P_{SPARE}$ is selected to be the pitch $P_{SPARE}$. In some embodiments, 2<$P_{SPARE}$. Selecting the smallest member reduces gaps between adjacent ECO base cells, which reduces wasted space and increases density (in terms of the number of devices per cell).

Figure 6D:
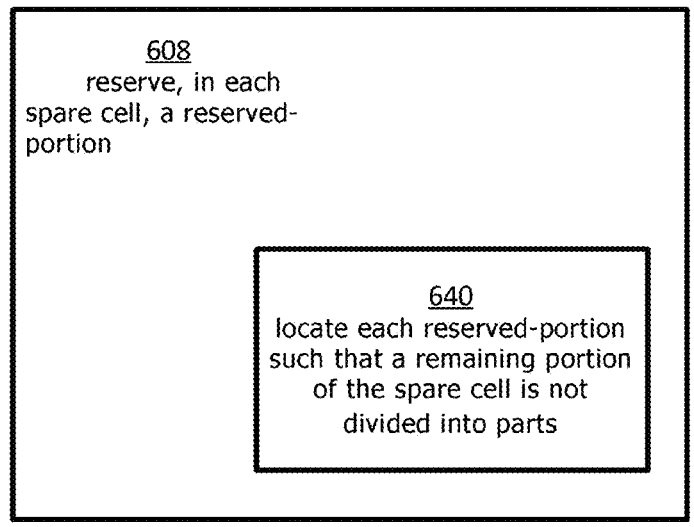
FIG. 6D is a detailed view of another block in the flowchart of FIG. 6A, in accordance with some embodiments.

FIG. 6D is a more detailed view of block 608 in method 600, in accordance with some embodiments.

In FIG. 6D, block 608 includes a block 640. At block 640, each reserved-portion is located/placed such that a remaining portion of the spare cell is not divided into parts.

Figure 7A:
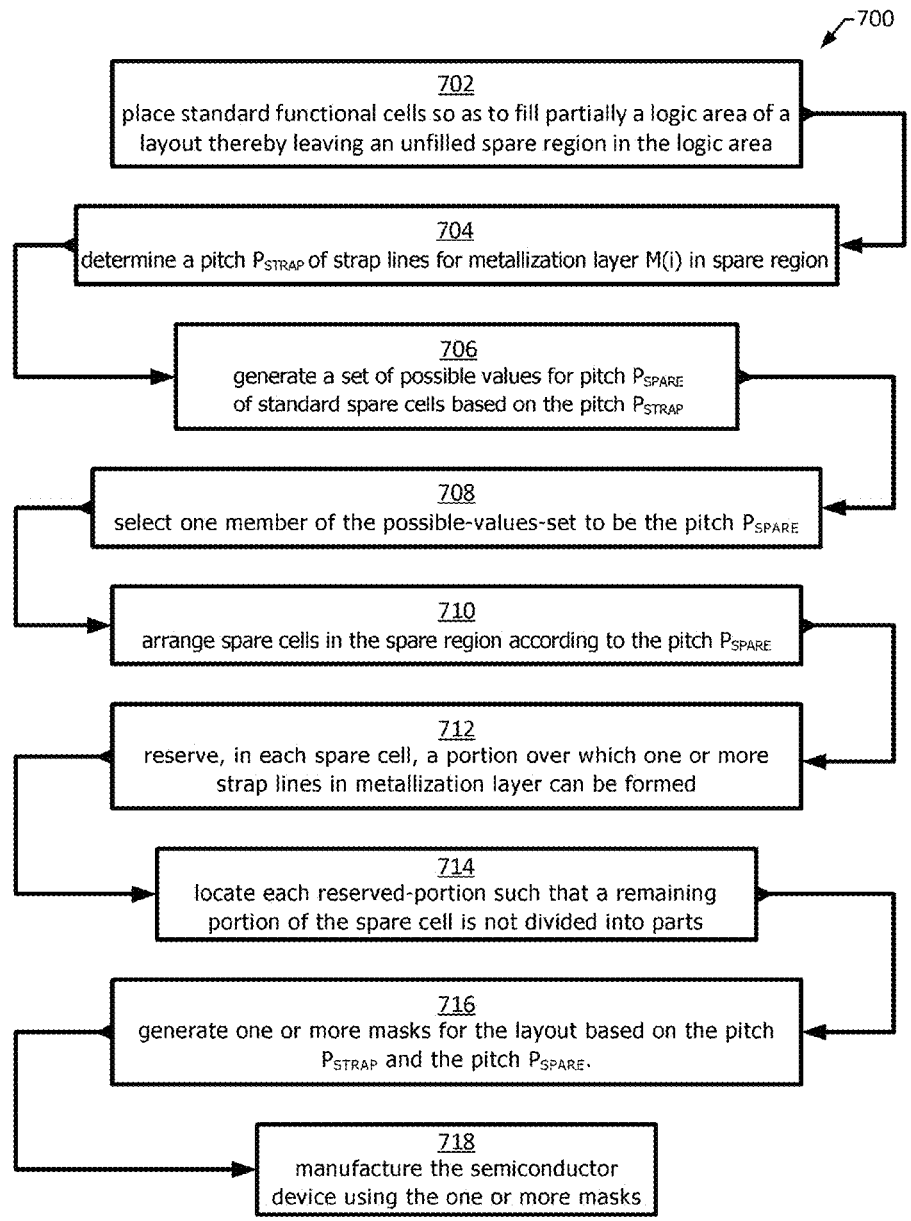
FIG. 7A is a flowchart of a method of designing, for a semiconductor device, a layout, in accordance with some embodiments.

FIG. 7A is a flowchart of a method 700 of designing, for a semiconductor device, a layout which includes standard functional cells and standard spare cells, in accordance with some embodiments.

In FIG. 7A, at block 702, standard functional cells are placed/arranged to fill partially a logic area of a layout according to at least one corresponding schematic design, which thereby leaves an unfilled spare region in the logic area. From block 702, flow proceeds to a block 704. At block 704, a pitch $P_{STRAP}$ of strap lines for a metallization layer M(i) is determined. In some embodiments, M(i) is M1. From block 704, flow proceeds to a block 706. At block 706, a set of possible values for a pitch $P_{SPARE}$ of spare cells is generated based on the pitch $P_{STRAP}$. Details of block 706 are explained with reference to FIG. 7B. From block 706, flow proceeds to a block 708. At block 708, one member of the possible-values-set is selected to be the pitch $P_{SPARE}$. Details of block 708 are explained with reference to FIG. 7C. From block 708, flow proceeds to a block 710. At block 710, standard spare cells are arranged/placed in the spare region according to the pitch $P_{SPARE}$. From block 710, flow proceeds to a block 712.

At block 712, in each spare cell, a portion is reserved/selected to be a reserved-portion, wherein one or more of the strap lines can be formed over the reserved-portion. In some embodiments, each reserved-portion extends across the spare cell. From block 712, flow proceeds to a block 714. At block 714, each reserved-portion is located/placed such that a remaining portion of the spare cell is not divided into parts. From block 714, flow proceeds to a block 716. At block 716, one or more masks for the layout are generated based on the pitch $P_{STRAP}$ and the pitch $P_{SPARE}$. From block 716, flow proceeds to a block 718. At block 718, the semiconductor device is manufactured using the one or more masks.

Figure 7B:
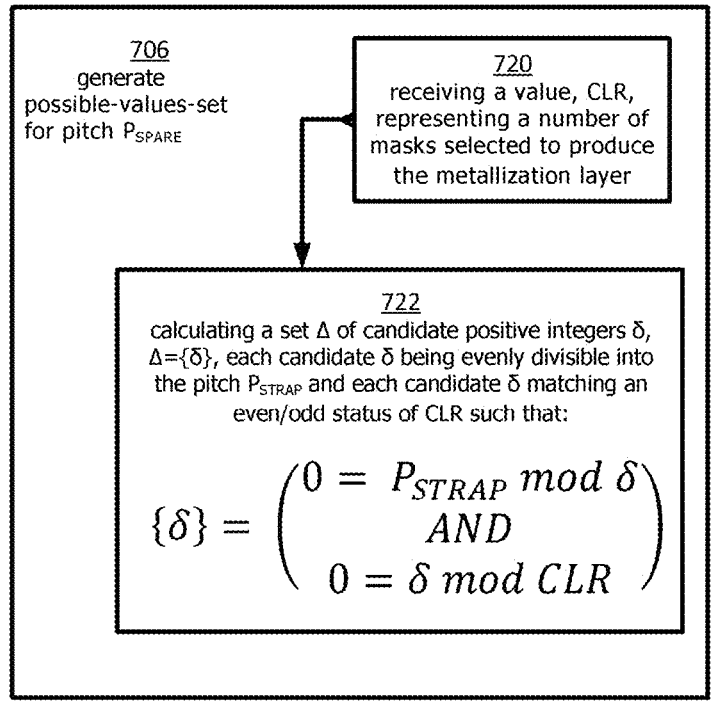
FIG. 7B is a detailed view of a block in the flowchart of FIG. 7A, in accordance with some embodiments.

FIG. 7B is a more detailed view of block 706 in method 700, in accordance with some embodiments.

In FIG. 7B, block 706 includes blocks 720 and 722. At block 720, a value for CLR is received, where CLR represents a number of masks selected to produce the metallization layer. From block 720, flow proceeds to a block 722. At block 722, a set $\Delta$ of candidate positive integers $\delta$, $\Delta=\{\delta\}$, is calculated. Each candidate $\delta$ is evenly divisible into the pitch $P_{STRAP}$ and each candidate $\delta$ matches an even/odd status of CLR such that:

$$\{\delta\} = \begin{pmatrix} 0 = P_{STRAP} \bmod \delta \\ \text{AND} \\ 0 = \delta \bmod CLR \end{pmatrix}.$$

Figure 7C:
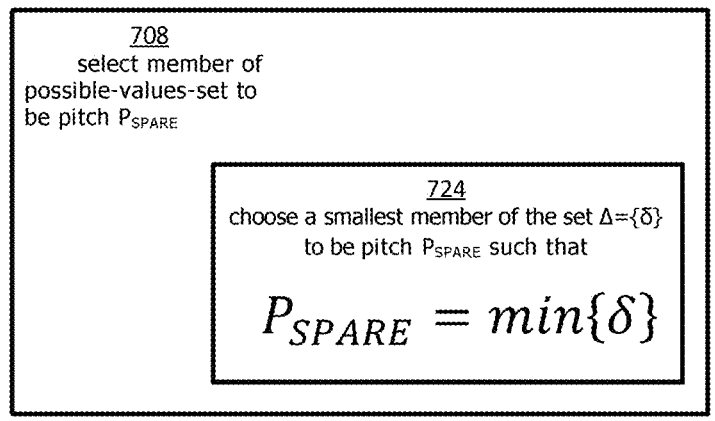
FIG. 7C is a detailed view of another block in the flowchart of FIG. 7A, in accordance with some embodiments.

FIG. 7C is a more detailed view of block 708 in method 700, in accordance with some embodiments.

In FIG. 7C, block 708 includes a block 724. At block 724, a smallest member of the set $\Delta=\{\delta\}$ is chosen to be the pitch $P_{SPARE}$ such that $P_{SPARE}=\min\{\delta\}$.

Figure 8:
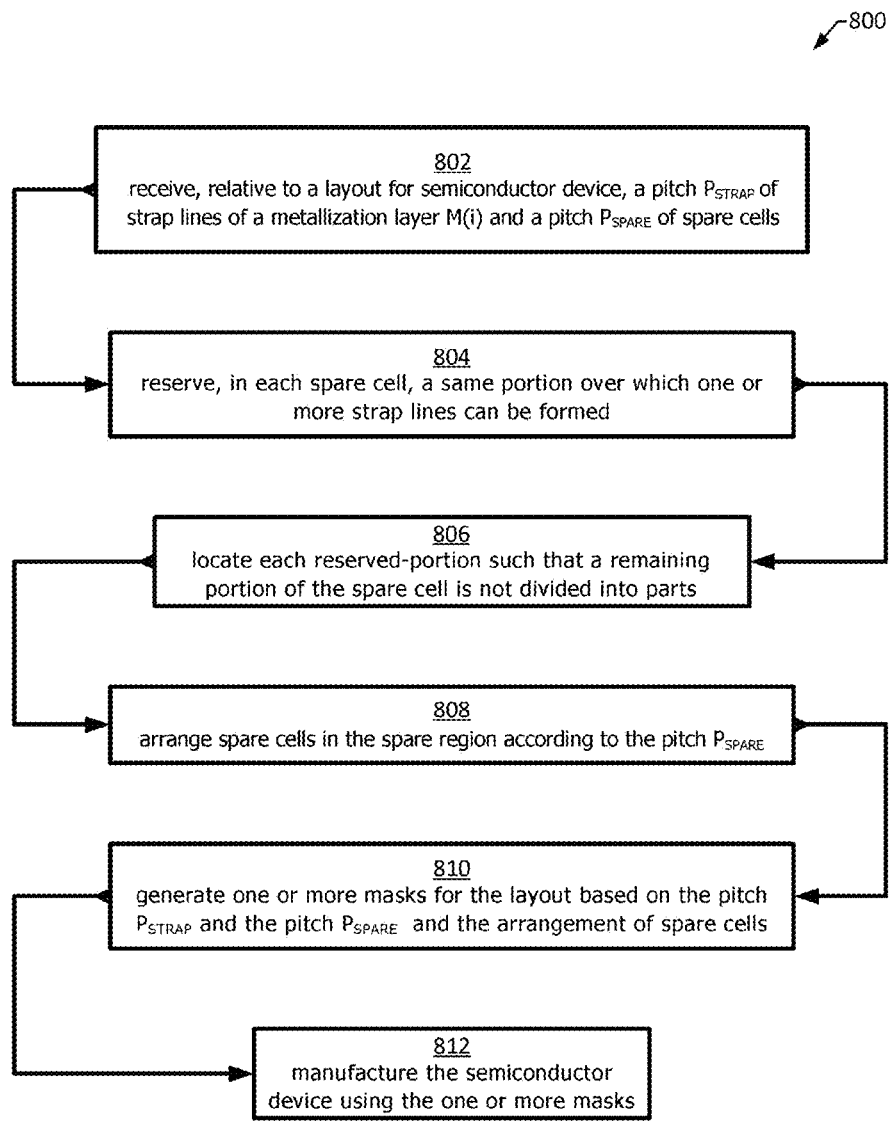
FIG. 8 is a flowchart of a method of designing, for a semiconductor device, a layout, in accordance with some embodiments.

FIG. 8 is a flowchart of a method 800 of designing, for a semiconductor device, a layout which includes standard spare cells, in accordance with some embodiments.

In FIG. 8, at block 802, relative to a layout for a semiconductor device, a pitch $P_{STRAP}$ of strap lines of a metallization layer M(i) and a pitch $P_{SPARE}$ of standard spare cells are received at an input device of a computer. In some embodiments, M(i) is M1. From block 802, flow proceeds to a block 804. At block 804, in each spare cell, a portion is reserved/selected to be a reserved-portion, wherein one or more of the strap lines can be formed over the reserved-portion. In some embodiments, each reserved-portion extends across the spare cell. From block 804, flow proceeds to a block 806. At block 806, each reserved-portion is located/placed such that a remaining portion of the spare cell is not divided into parts. From block 806, flow proceeds to a block 808. At block 808, in a spare region of a logic area, spare cells are arranged/placed according to the pitch $P_{SPARE}$. From block 808, flow proceeds to a block 810. At block 810, one or more masks for the layout are generated based on the pitch $P_{STRAP}$ and the pitch $P_{SPARE}$. From block 816, flow proceeds to a block 818. At block 818, the semiconductor device is manufactured using the one or more masks.

Figure 9A:
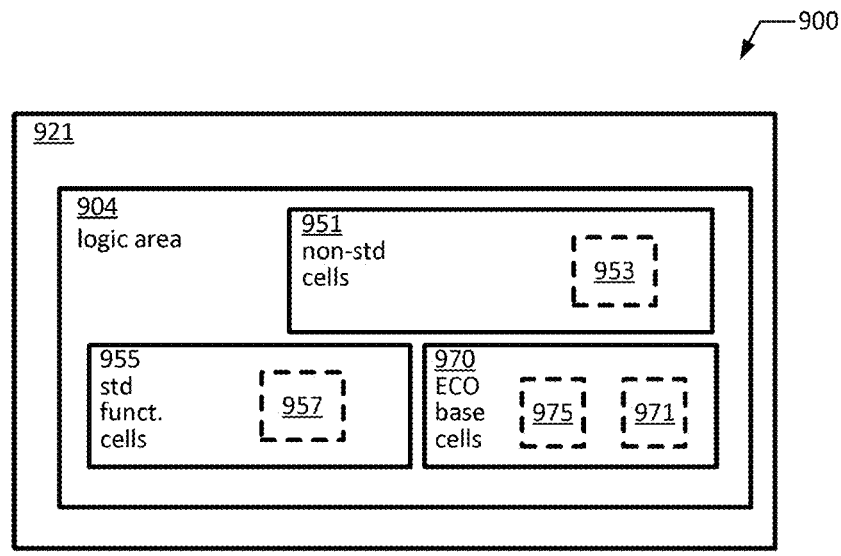
FIG. 9A is a schematic view of a semiconductor device, in accordance with some embodiments.

FIG. 9A is a schematic view of a semiconductor device 900, in accordance with some embodiments.

Device 900 includes an IC formed on a substrate 921. Device 900 includes a logic area 904. In some embodiments, logic area 904 is configured to provide a higher-level functionality of device 900. In some embodiments, logic area 904 represents one or more circuits. In some embodiments, logic area 904 includes an array 970 of ECO cells and one or more non-standard cells 951 (one or more custom cells and/or one or more macro cells). In some embodiments, logic area 904 includes array 970 of ECO cells and one or more standard functional cells 955 organized into one or more arrangements which provide corresponding one or more high-level functions. Included among non-standard cells 951 is a set of one on or more non-standard cells 953. Included among standard functional cells 955 is a set of one or more standard functional cells 957. Included among the ECO cells in array 970 is a set 971 of one or more ECO cells and a set 975 of one or more ECO cells. Initially, all of the ECO cells in array 970 are ECO base cells because none of the ECO cells have yet to be programmed (transformed) into ECO programmed cells. As such, FIG. 9A represents an initial state of device 900 in which none of the ECO cells in array 970 are connected (or routed) to non-standard cells 951 or standard functional cells 955.

Figure 9B:
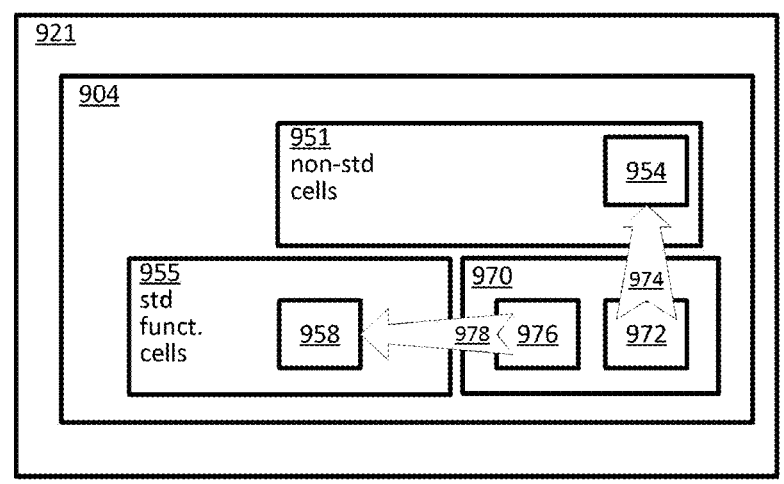
FIG. 9B is a schematic view of the semiconductor device of FIG. 9A revised with one or more ECO programmed cells, in accordance with some embodiments.

FIG. 9B is a schematic view of the semiconductor device 900 with one or more ECO programmed cells and one or more ECO base cells, in accordance with some embodiments.

FIG. 9B represents a revised state of device 900. More particularly, FIG. 9B shows that set 971 of one or more ECO base cells and set 975 of one or more ECO base cells has been programmed, which has transformed sets 971 and 975 into corresponding sets 972 and 976 of one or more ECO programmed cells. In some embodiments, FIG. 9B reflects an assumption that set 953 has failed. Accordingly, routing 974 represents connections that have been made between set 972 of ECO programmed cells and logic area 904 so that set 972 can serve (in effect) as a replacement for failed set 953. In some embodiments, FIG. 9B reflects an assumption that set 957 has failed. Accordingly, routing 978 represents connections that have been made between set 976 of ECO programmed cells and logic area 904 so that set 976 can serve (in effect) as a replacement for failed set 958.

Figure 10:
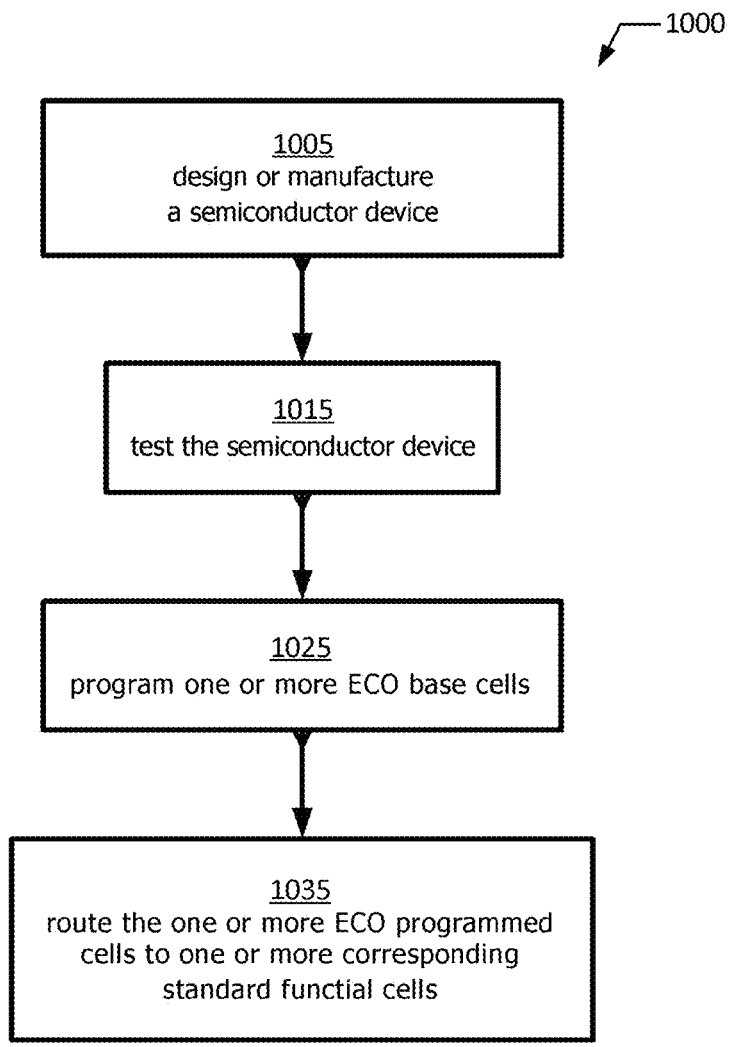
FIG. 10 is a flow chart of a method of manufacturing a semiconductor device, in accordance with some embodiments.

FIG. 10 is a flow chart of a method 1000 of designing or manufacturing a semiconductor device, in accordance with some embodiments. The following description of the method of FIG. 10 will be made with reference to FIGS. 9A and 9B.

In FIG. 10, at block 1005, a semiconductor device is designed or manufactured. In some embodiments, the device of block 1005 is a semiconductor device 900 as shown in FIG. 9A. From block 1005, flow proceeds to a block 1015. At block 1015, device 900 (as designed or manufactured) is tested. In some embodiments, logic area 904 of device 900 is tested, e.g., by one or more simulations, and checked against a plurality of design rules and/or the intended specification of device 900. In at least one embodiment, a test version of device 900 is manufactured based on the initial design and then the manufactured test version of device 900 is tested. Based on the test results of the designed device 900 and/or the manufactured test version of device 900, a decision is made to revise the design, e.g., because of an unacceptable timing issue, an unacceptable electromigration issue, or the like. From block 1015, flow proceeds to a block 1025. In some circumstances, despite the test results not triggering a revision to the design, a design change is requested. In such circumstances, the design change is received and flow proceeds from block 1015 to a block 1025. In some other circumstances, in addition to the test results triggering a revision to the design, a design change also is received. In such other circumstances, flow similarly proceeds from block 1015 to block 1025.

At block 1025, one or more ECO base cells in array 970 are programed if the test results indicate that the design is to be revised and/or a design change has been received. For example, if the design is to be revised to replace failed set 953 and/or failed set 957 (shown in FIG. 9A), then one or more ECO base cells in array 970, e.g., sets 971 and/or 975 (shown in FIG. 9A), are programmed to provide the equivalent function of corresponding failed sets 953 and/or 957. Programming sets 971 and/or 975 transforms the one or more ECO base cells in sets 971 and/or 975 into corresponding sets 972 and/or 976 of one or more ECO programmed cells. From block 1025, flow proceeds to a block 1035. At block 1035, one or more ECO programmed cells in sets 972 and/or 976 are routed (electrically connected) to corresponding one or more standard functional cells in logic area 904, thereby (in effect) replacing failed sets 953 and/or 957.

In at least one embodiment, one or more ECO base cells in array 970 are programmed and routed to modify, rather than replace, one or more cells (not shown) (which have not necessarily failed) in logic area 904. In at least one embodiment, one or more ECO base cells in array 970 are programmed and routed to add new functionality to logic area 904. In some embodiments, the revised design of the IC and/or an IC manufactured based on the revised design are tested to determine whether further revisions are to be made. In at least one embodiment, the process repeats until determination is made that the IC is to be re-designed or that the revised design of the IC is satisfactory for mass manufacture.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, one or more operations of the method 1000 is/are performed by one or more computer systems. For example, one or more of the operations of designing an IC, simulating a design of the IC, programming ECO base cells, and routing the ECO programmed cells to a circuit of the IC are performed by one or more computer systems.

Figure 11:
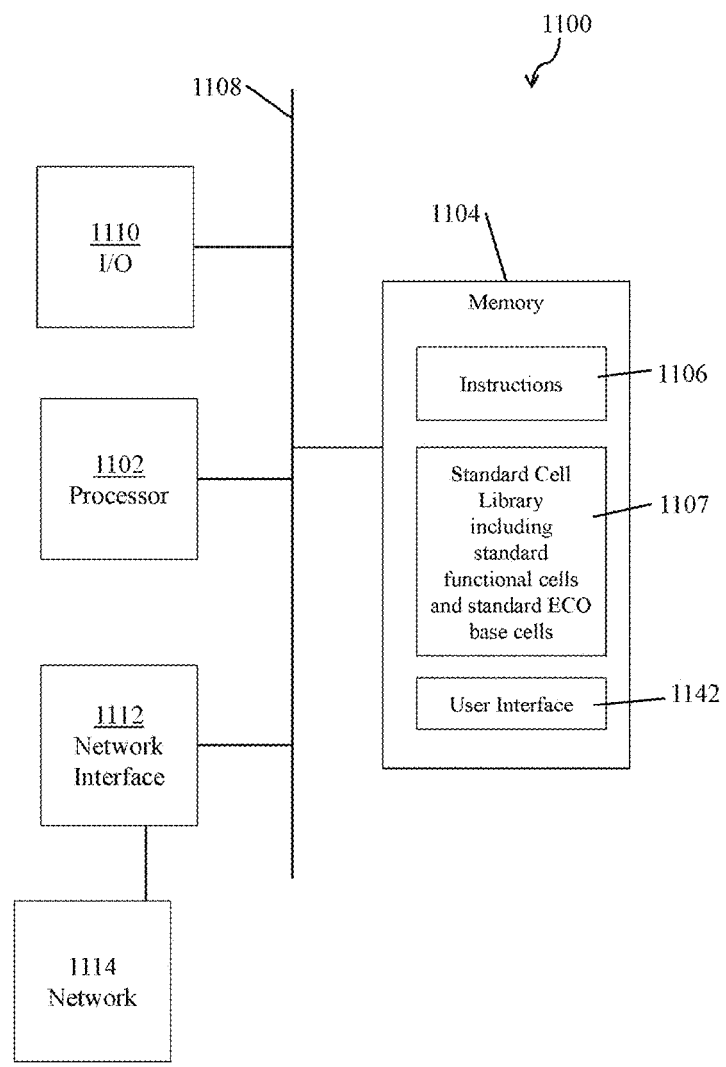
FIG. 11 is a block diagram of an EDA system, in accordance with some embodiments.

FIG. 11 is a block diagram of an electronic design automation (EDA) system 1100 in accordance with some embodiments.

In some embodiments, EDA system 1100 is a general purpose computing device including a hardware processor 1102 and a non-transitory, computer-readable storage medium 1104. Storage medium 1104, amongst other things, is encoded with, i.e., stores, computer program code 1106, i.e., a set of executable instructions. Execution of instructions 1106 by hardware processor 1102 represents (at least in part) an EDA tool which implements a portion or all of, e.g., the standard functional cell selection process, the placement process, the routing process, the testing process and/or the overall SPRT process, and the processes as described, e.g., in at least one of the methods of FIGS. 6A-6D, 7A-7C, 8 and 10, in accordance with one or more embodiments (hereinafter, the noted PROCESSES AND/OR METHODS).

Processor 1102 is electrically coupled to computer-readable storage medium 1104 via a bus 1108. Processor 1102 is also electrically coupled to an I/O interface 1110 by bus 1108. A network interface 1112 is also electrically connected to processor 1102 via bus 1108. Network interface 1112 is connected to a network 1114, so that processor 1102 and computer-readable storage medium 1104 are capable of connecting to external elements via network 1114. Processor 1102 is configured to execute computer program code (instructions) 1106 encoded in computer-readable storage medium 1104 in order to cause system 1100 to be usable for performing a portion or all of the noted PROCESSES AND/OR METHODS. In one or more embodiments, processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, storage medium 1104 stores computer program code 1106 configured to cause system 1100 (where such execution represents (at least in part) the EDA tool) to be usable for performing a portion or all of the noted PROCESSES AND/OR METHODS. In one or more embodiments, storage medium 1104 also stores information which facilitates performing a portion or all of the noted PROCESSES AND/OR METHODS. In one or more embodiments, storage medium 1104 stores library 1107 of standard cells including standard functional cells and standard ECO base cells.

EDA system 1100 includes I/O interface 1110. I/O interface 1110 is coupled to external circuitry. In one or more embodiments, I/O interface 1120 includes a keyboard, keypad, mouse, trackball, trackpad, touchscreen, and/or cursor direction keys for communicating information and commands to processor 1102.

EDA system 1100 also includes network interface 1112 coupled to processor 1102. Network interface 1112 allows system 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted PROCESSES AND/OR METHODS, is implemented in two or more systems 1100.

System 1100 is configured to receive information through I/O interface 1110. The information received through I/O interface 1110 includes one or more of instructions, data, design rules, libraries of standard cells, and/or other parameters for processing by processor 1102. The information is transferred to processor 1102 via bus 1108. EDA system 1100 is configured to receive information related to a UI through I/O interface 1110. The information is stored in computer-readable medium 1104 as UI 1142.

In some embodiments, a portion or all of the noted PROCESSES AND/OR METHODS is implemented as a standalone software application for execution by a processor. In some embodiments, a portion or all of the noted PROCESSES AND/OR METHODS is implemented as a software application that is a part of an additional software application. In some embodiments, a portion or all of the noted PROCESSES AND/OR METHODS is implemented as a plug-in to a software application. In some embodiments, at least one of the noted PROCESSES AND/OR METHODS is implemented as a software application that is a portion of an EDA tool. In some embodiments, a portion or all of the noted PROCESSES AND/OR METHODS is implemented as a software application that is used by EDA system 1100. In some embodiments, a layout which includes standard cells plus ECO base cells and/or ECO programmed cells is generated using a tool such as VIRTUOSO® available from CADENCE DESIGN SYSTEMS, Inc., or another suitable layout generating tool.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing apparatus, cause the apparatus to perform the actions. In some embodiments, a method for manufacturing a semiconductor device to which corresponds a layout diagram that is stored on a non-transitory computer-readable medium includes generating the layout diagram using an electronic design system (EDS), the EDS including at least one processor and at least one memory including computer program code for one or more programs, and where the at least one memory, the computer program code and the at least one processor are configured to cause the EDS to execute the generating; testing the semiconductor device or a representation of the semiconductor device; and revising, based on results of the testing, the layout diagram using the EDS, the results being indicative of one or more selected standard functional cells in the layout diagram which merit modification or replacement, the revising including: programming one or more of the ECO cells which correspond to the one or more selected standard functional cells resulting in one or more programmed ECO cells; and routing the one or more programmed ECO cells correspondingly to at least one of the selected standard functional cells or to one or more other ones of the standard functional cells. Other embodiments of this aspect include corresponding computer systems, apparatus, and computer programs recorded on one or more computer storage devices, each configured to perform the actions of the methods.

Implementations may include one or more of the following features. The method where the generating the layout diagram further includes: placing the standard functional cells to partially fill the logic area of the layout diagram according to at least one corresponding schematic design thereby leaving, as unfilled, a spare region in the logic area. The generating the layout diagram further includes: selecting a first pitch for additional cells to be placed in the spare region based on a second pitch of strap lines of a metallization layer in the layout diagram, where using the first pitch minimizes wasted space in the spare region. The generating the layout diagram further includes: selecting standard not-yet-programmed (SNYP) spare cells, which are to become at least some of the one or more standard functional cells, according to the first pitch. The generating the layout diagram further includes: placing the selected SNYP spare cells into the spare region of the layout diagram. The generating the layout diagram further includes: reserving, in each selected SNYP spare cell, a reserved-portion over which one or more strap lines are formable, each reserved portion extending in a first direction across a corresponding SNYP cell; and where each of the first and second pitches extends in a second direction, the second direction being substantially perpendicular to the first direction. The generating the layout diagram further includes: locating each reserved-portion such that a remaining portion of the SNYP spare cell is undivided. Implementations of the described techniques may include hardware, a method or process, or computer software on a computer-accessible medium.

In some embodiments, a method for manufacturing a semiconductor device to which corresponds a layout diagram that is stored on a non-transitory computer-readable medium includes generating the layout diagram using an electronic design system (EDS), the EDS including at least one processor and at least one memory including computer program code for one or more programs, and where the at least one memory, the computer program code and the at least one processor are configured to cause the EDS to execute the generating; simulating the semiconductor device; and revising, based on results of the simulating, the layout diagram using the EDS, the results being indicative of one or more selected standard functional cells in the layout diagram which merit modification or replacement, the revising including: programming one or more of the ECO cells which correspond to the one or more selected standard functional cells resulting in one or more programmed ECO cells; and routing the one or more programmed ECO cells correspondingly to at least one of the selected standard functional cells or to one or more other ones of the standard functional cells. Other embodiments of this aspect include corresponding computer systems, apparatus, and computer programs recorded on one or more computer storage devices, each configured to perform the actions of the methods.

Implementations may include one or more of the following features. The method includes: verifying, against a plurality of design rules, the semiconductor device performed the simulation acceptably. The method includes: revising, based upon a design change request, the layout diagram. The programming the one or more of the ECO cells, includes: programming the one or more of the array of ECO cells with an equivalent function of the one or more selected standard functional cells in the layout diagram which merit modification or replacement. The programming the one or more of the ECO cells includes: converting, functionally, the one or more of the array of ECO cells into the one or more standard functional cells. The method includes: placing the standard functional cells to partially fill the logic area of the layout diagram according to at least one corresponding schematic design thereby leaving, as unfilled, a spare region in the logic area. Implementations of the described techniques may include hardware, a method or process, or computer software on a computer-accessible medium.

In some embodiments, a non-transitory computer-readable storage medium includes executable instructions that includes generating the layout diagram; simulating the semiconductor device; and revising, based on results of the simulating, the layout diagram, the results being indicative of one or more selected standard functional cells in the layout diagram which merit modification or replacement, the revising including: converting one or more of the ECO cells which correspond to the one or more selected standard functional cells from being non-operational into be operational resulting in one or more programmed ECO cells; and routing the one or more programmed ECO cells correspondingly to at least one of the selected standard functional cells or to one or more other ones of the standard functional cells. Other embodiments of this aspect include corresponding computer systems, apparatus, and computer programs recorded on one or more computer storage devices, each configured to perform the actions of the methods.

Implementations may include one or more of the following features. The non-transitory computer-readable storage medium where generating the layout diagram further includes: placing the standard functional cells to partially fill the logic area of the layout diagram according to at least one corresponding schematic design thereby leaving, as unfilled, a spare region in the logic area. The non-transitory computer-readable storage medium where generating the layout diagram further includes: selecting a first pitch for additional cells to be placed in the spare region based on a second pitch of strap lines of a metallization layer in the layout diagram, where use of the first pitch minimizes wasted space in the spare region; selecting standard not-yet-programmed (SNYP) spare cells, which are to become at least some of the additional cells, according to the first pitch; and placing the selected SNYP spare cells into the spare region of the layout diagram. Generating the layout diagram further includes: generating a set of possible values for the first pitch based on the second pitch; and selecting one member of the set of possible values to be the first pitch; and where: the generating the set of possible values including: receiving a value representing a number, clr, of masks selected to produce the metallization layer; and calculating a set $\delta$ of candidate integers $\delta$, $\delta=\{\delta\}$, each candidate $\delta$ being positive and evenly divisible into the first pitch and each candidate $\delta$ matching an even/odd status of the value representing the clr, of the masks such that:

$$\{\delta\} = \begin{pmatrix} 0 = \text{first\_strap} \bmod \delta \\ \text{AND} \\ 0 = \delta \bmod CLR \end{pmatrix};$$

and
the selecting the one member of the set of possible values includes; selecting the one member from the set $\delta=\{\delta\}$ to be the second pitch. Generating the layout diagram further includes: where the selecting the one member from the set $\delta=\{\delta\}$ includes: choosing a smallest member of the set $\delta=\{\delta\}$ to be the second pitch such that second_pitch=min $\delta$. Generating the layout diagram further includes: where the selecting the first pitch includes: generating the set of possible values for the first pitch based on the second pitch; and selecting the one member of the set of possible values to be the first pitch; and where: the generating the set of possible values for the first pitch includes: calculating a first group of first candidate positive integers, each first candidate integer being positive and evenly divisible into the second pitch; calculating a second group of second candidate integers, each second candidate integer being positive and evenly divisible by a number of masks selected to produce the metallization layer; and intersecting the first and second groups of candidate integers to form a third group of candidate integers; and the third group of candidate integers represents the set of possible values for the first pitch. Generating the layout diagram further includes: where the selecting the one member of the set of possible values includes: choosing the smallest member of the set of possible values to be the first pitch, where the first pitch is represented by first_pitch, such that 2<first_pitch. Implementations of the described techniques may include hardware, a method or process, or computer software on a computer-accessible medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for manufacturing a semiconductor device to which corresponds a layout diagram that is stored on a non-transitory computer-readable medium, the semiconductor device including an integrated circuit (IC) formed on a substrate, the IC including a logic area configured to provide a higher-level functionality of the IC, the layout diagram representing the logic area as including an array of engineering change order (ECO) cells and one or more non-standard cells and one or more standard functional cells, each of the non-standard cells including one or more custom cells and one or more macro cells, and each of the standard functional cells being organized into one or more arrangements configured to provide corresponding one or more high-level functions, the method comprising:
generating the layout diagram using an electronic design system (EDS), the EDS including at least one processor and at least one memory including computer program code for one or more programs, and wherein the at least one memory, the computer program code and the at least one processor are configured to cause the EDS to execute the generating;
testing the semiconductor device or a representation of the semiconductor device; and
revising, based on results of the testing, the layout diagram using the EDS, the results being indicative of one or more selected standard functional cells in the layout diagram which merit modification or replacement, the revising including:
programming one or more of the ECO cells which correspond to the one or more selected standard functional cells resulting in one or more programmed ECO cells;

routing the one or more programmed ECO cells correspondingly to at least one of the selected standard functional cells or to one or more other ones of the standard functional cells;

placing the standard functional cells to partially fill the logic area of the layout diagram according to at least one corresponding schematic design thereby leaving, as unfilled, a spare region in the logic area; and selecting a first pitch for additional cells to be placed in the spare region based on a second pitch of strap lines of a metallization layer in the layout diagram, wherein using the first pitch minimizes wasted space in the spare region.

2. The method of claim 1, wherein the generating the layout diagram further includes:

selecting standard not-yet-programmed (SNYP) spare cells, which are to become at least some of the one or more standard functional cells, according to the first pitch.

3. The method of claim 2, wherein the generating the layout diagram further includes:

placing the selected SNYP spare cells into the spare region of the layout diagram.

4. The method of claim 3, wherein the generating the layout diagram further includes:

reserving, in each selected SNYP spare cell, a reserved-portion over which one or more strap lines are formable, each reserved portion extending in a first direction across a corresponding SNYP cell; and wherein each of the first and second pitches extends in a second direction, the second direction being substantially perpendicular to the first direction.

5. The method of claim 4, wherein the generating the layout diagram further includes:

locating each reserved-portion such that a remaining portion of the SNYP spare cell is undivided.

6. The method of claim 1 further comprising:

verifying, against a plurality of design rules, that the results of the testing are acceptable.

7. A method for manufacturing a semiconductor device to which corresponds a layout diagram that is stored on a non-transitory computer-readable medium, the semiconductor device including an integrated circuit (IC) formed on a substrate, the IC including a logic area configured to provide a higher-level functionality of the IC, the layout diagram representing the logic area as including an array of engineering change order (ECO) cells and one or more non-standard cells and one or more standard functional cells, each of the non-standard cells including one or more custom cells and one or more macro cells, and each of the standard functional cells being organized into one or more arrangements configured to provide corresponding one or more high-level functions, the method comprising:

generating the layout diagram using an electronic design system (EDS), the EDS including at least one processor and at least one memory including computer program code for one or more programs, and wherein the at least one memory, the computer program code and the at least one processor are configured to cause the EDS to execute the generating;

simulating the semiconductor device; and revising, based on results of the simulating, the layout diagram using the EDS, the results being indicative of one or more selected standard functional cells in the layout diagram which merit modification or replacement, the revising including:

programming one or more of the ECO cells which correspond to the one or more selected standard functional cells resulting in one or more programmed ECO cells;

routing the one or more programmed ECO cells correspondingly to at least one of the selected standard functional cells or to one or more other ones of the standard functional cells;

placing the standard functional cells to partially fill the logic area of the layout diagram according to at least one corresponding schematic design thereby leaving, as unfilled, a spare region in the logic area; and selecting a first pitch for additional cells to be placed in the spare region based on a second pitch of strap lines of a metallization layer in the layout diagram.

8. The method of claim 7 further comprising:

verifying, against a plurality of design rules, that the results of the simulating are acceptable.

9. The method of claim 7 further comprising:

revising, based upon a design change request, the layout diagram.

10. The method of claim 7 wherein the programming the one or more of the ECO cells, comprises:

programming the one or more of the array of ECO cells with an equivalent function of the one or more selected standard functional cells in the layout diagram which merit modification or replacement.

11. The method of claim 10 wherein the programming the one or more of the ECO cells comprises:

converting, functionally, the one or more of the array of ECO cells into the one or more standard functional cells.

12. The method of claim 7, wherein:

using the first pitch minimizes wasted space in the spare region; and the generating the layout diagram further includes:

selecting standard not-yet-programmed (SNYP) spare cells, which are to become at least some of the one or more standard functional cells, according to the first pitch.

13. The method of claim 12, wherein the generating the layout diagram further includes:

placing the selected SNYP spare cells into the spare region of the layout diagram.

14. A non-transitory computer-readable storage medium comprising executable instructions that, when executed by a processor, facilitate performance of a method for manufacturing a semiconductor device to which corresponds a layout diagram that is stored on a non-transitory computer-readable medium, the semiconductor device including an integrated circuit (IC) formed on a substrate, the IC including a logic area configured to provide a higher-level functionality of the IC, the layout diagram representing the logic area as including an array of engineering change order (ECO) cells and one or more non-standard cells and one or more standard functional cells, each of the non-standard cells including one or more custom cells and one or more macro cells, and each of the standard functional cells being organized into one or more arrangements configured to provide corresponding one or more high-level functions, the method comprising:

generating the layout diagram;

simulating the semiconductor device; and revising, based on results of the simulating, the layout diagram, the results being indicative of one or more selected standard functional cells in the layout diagram which merit modification or replacement, the revising including:

converting one or more of the ECO cells which correspond to the one or more selected standard functional cells from being non-operational into be operational resulting in one or more programmed ECO cells;

routing the one or more programmed ECO cells correspondingly to at least one of the selected standard functional cells or to one or more other ones of the standard functional cells;

placing the standard functional cells to partially fill the logic area of the layout diagram according to at least one corresponding schematic design thereby leaving, as unfilled, a spare region in the logic area; and selecting a first pitch for additional cells to be placed in the spare region based on a second pitch of strap lines of a metallization layer in the layout diagram, wherein use of the first pitch minimizes wasted space in the spare region.

15. The non-transitory computer-readable storage medium of claim 14, wherein the generating the layout diagram further comprises:

selecting standard not-yet-programmed (SNYP) spare cells, which are to become at least some of the additional cells, according to the first pitch; and placing the selected SNYP spare cells into the spare region of the layout diagram.

16. The non-transitory computer-readable storage medium of claim 15, wherein the generating the layout diagram further comprises:

generating a set of possible values for the first pitch based on the second pitch; and selecting one member of the set of possible values to be the first pitch; and wherein:

the generating the set of possible values including:

receiving a value representing a number, CLR, of masks selected to produce the metallization layer; and calculating a set $\Delta$ of candidate integers $\delta$, $\Delta=\{\delta\}$, each candidate $\delta$ being positive and evenly divisible into the first pitch and each candidate $\delta$ matching an even/odd status of the value representing the CLR, of the masks such that:

$$\{\delta\} = \begin{pmatrix} 0 = \text{first\_strap} \bmod \delta \\ \text{AND} \\ 0 = \delta \bmod CLR \end{pmatrix};$$

and the selecting the one member of the set of possible values includes:

selecting the one member from the set $\Delta=\{\delta\}$ to be the second pitch.

17. The non-transitory computer-readable storage medium of claim 16, wherein the generating the layout diagram further comprises:

wherein the selecting the one member from the set $\Delta=\{\delta\}$ includes:

choosing a smallest member of the set $\Delta=\{\delta\}$ to be the second pitch such that second_pitch=min{$\delta$}.

18. The non-transitory computer-readable storage medium of claim 17, wherein:

the selecting the first pitch includes:

generating the set of possible values for the first pitch based on the second pitch; and selecting the one member of the set of possible values to be the first pitch;

the generating the set of possible values for the first pitch includes:

calculating a first group of first candidate positive integers, each first candidate integer being positive and evenly divisible into the second pitch;

calculating a second group of second candidate integers, each second candidate integer being positive and evenly divisible by a number of masks selected to produce the metallization layer; and intersecting the first and second groups of candidate integers to form a third group of candidate integers; and the third group of candidate integers represents the set of possible values for the first pitch.

19. The non-transitory computer-readable storage medium of claim 18, wherein the selecting the one member of the set of possible values includes:

choosing the smallest member of the set of possible values to be the first pitch, where the first pitch is represented by first_pitch, such that 2<first_pitch.

20. The method of claim 14 further comprising:

revising, based upon a design change request, the layout diagram.

* * * * *